US010678541B2

(12) United States Patent
Forsyth et al.

(10) Patent No.: US 10,678,541 B2
(45) Date of Patent: Jun. 9, 2020

(54) PROCESSORS HAVING FULLY-CONNECTED INTERCONNECTS SHARED BY VECTOR CONFLICT INSTRUCTIONS AND PERMUTE INSTRUCTIONS

(75) Inventors: Andrew Thomas Forsyth, Kirkland, WA (US); Dennis R. Bradford, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1149 days.

(21) Appl. No.: 13/977,126

(22) PCT Filed: Dec. 29, 2011

(86) PCT No.: PCT/US2011/067982
§ 371 (c)(1),
(2), (4) Date: Jun. 28, 2013

(87) PCT Pub. No.: WO2013/101132
PCT Pub. Date: Jul. 4, 2013

(65) Prior Publication Data
US 2014/0181466 A1 Jun. 26, 2014

(51) Int. Cl.
*G06F 9/30* (2018.01)
*G06F 9/38* (2018.01)

(52) U.S. Cl.
CPC ...... *G06F 9/30036* (2013.01); *G06F 9/30021* (2013.01); *G06F 9/30032* (2013.01);
(Continued)

(58) Field of Classification Search
CPC ............. G06F 9/30021; G06F 9/30032; G06F 9/30036
See application file for complete search history.

(56) References Cited

U.S. PATENT DOCUMENTS 6,178,500 B1 * 1/2001 Roth .................. G06F 9/30032
712/300
7,051,186 B2 5/2006 Asaad et al.
(Continued)

FOREIGN PATENT DOCUMENTS

CN 101101541 A 1/2008
CN 101208658 A 6/2008
(Continued)

OTHER PUBLICATIONS

Linda Null and Julia Lobur, The essentials of computer organization and architecture, 2006, Jones and Bartlett Publishers, Second edition, 8 pages.*
(Continued)

*Primary Examiner* — Jyoti Mehta
(74) *Attorney, Agent, or Firm* — NDWE, LLP

(57) ABSTRACT

An apparatus includes a decode unit to decode a permute instruction and a vector conflict instruction. A vector execution unit is coupled with the decode unit and includes a fully-connected interconnect. The fully-connected interconnect has at least four inputs to receive at least four corresponding data elements of at least one source vector. The fully-connected interconnect has at least four outputs. Each of the at least four inputs is coupled with each of the at least four outputs. The execution unit also includes a permute instruction execution logic coupled with the at least four outputs and operable to store a first vector result in response to the permute instruction. The execution unit also includes a vector conflict instruction execution logic coupled with the at least four outputs and operable to store a second vector result in a destination storage location in response to the vector conflict instruction.

18 Claims, 25 Drawing Sheets

(52) U.S. Cl.
CPC ........ *G06F 9/30145* (2013.01); *G06F 9/3818*
(2013.01); *G06F 9/3838* (2013.01)

(56) References Cited

U.S. PATENT DOCUMENTS

| | | | |
|---|---|---|---|
| 7,305,540 B1 | 12/2007 | Trivedi et al. | |
| 7,933,405 B2 | 3/2011 | Knowles et al. | |
| 8,972,698 B2 | 3/2015 | Hughes et al. | |
| 2002/0112147 A1* | 8/2002 | Chennupaty | ........ G06F 9/30025 712/223 |
| 2003/0014457 A1 | 1/2003 | Desai et al. | |
| 2005/0240644 A1 | 10/2005 | Van Berkel et al. | |
| 2008/0288754 A1* | 11/2008 | Gonion | ............... G06F 9/30072 712/217 |
| 2009/0150648 A1 | 6/2009 | Mejdrich | |
| 2009/0249026 A1* | 10/2009 | Smelyanskiy | ...... G06F 9/30032 712/4 |
| 2012/0166761 A1* | 6/2012 | Hughes | ............... G06F 9/30018 712/7 |

FOREIGN PATENT DOCUMENTS

| | | | |
|---|---|---|---|
| CN | 101510082 A | 8/2009 | |
| WO | 2000/22511 A1 | 4/2000 | |
| WO | 2006/106342 A2 | 10/2006 | |
| WO | WO 2012087548 A2 * | 6/2012 | ......... G06F 9/30018 |
| WO | 2013/101132 A1 | 7/2013 | |

OTHER PUBLICATIONS

Difference between SRAM and DRAM, Ben Joan, Apr. 25, 2010, 3 pages, retrieved from the internet on Dec. 22, 2016], retrieved from URL <www.differencebetween.net/technology/difference-between-sram-and-dram/>.*

Julius O. Smith III, DSP versus RISC processors, Aug. 18, 2004, 2 pages, [retrieved from the internet on Dec. 23, 2016], retrieved from URL <ccrma.stanford.edu/~jos/kna/DSP_versus_RISC_Processors. html>.*

Michael Abrash, A first look at the Larrabee New Instrucitons (LRBni), Apr. 1, 2009, Dr. Dobb's The world of software development, 28 pages, [retrieved from the internet on Sep. 18, 2017], retrieved from URL <www.drdobbs.com/parallel/a-first-look-at-the-larrabee-new-instruc/216402188>.*

International Preliminary Report on Patentability and Written Opinion received for PCT Patent Application No. PCT/US2011/067982, dated Jul. 10, 2014, 7 Pages.

Office Action received for Taiwan Patent Application No. 101147488, dated Apr. 10, 2015, 10 pages of English Translation and 11 pages of Taiwan Office Action.

Notice of Allowance received for Taiwanese Patent Application No. 101147488, dated Nov. 24, 2015, 2 pages of Official copy only.

Office Action received for Chinese Patent Application No. 201180076104.5, dated Feb. 29, 2016, 11 pages (6 pages of English translation and 5 pages of Official copy).

Extended European Search Report received for European Patent Application No. 11878342.2, dated Jun. 23, 2016, 9 pages.

"Notification of Transmittal of the International Search Report and the Written Opinion of the International Searching Authority, or the Declaration" dated Sep. 17, 2012 pp. 10, in PCT/US2011/067982.

Office Action received for Chinese Patent Application No. 201180076104.5, dated May 3, 2017, 14 pages of Chinese Office Action including 7 pages of English Translation.

Notice of Allowance received for Chinese Patent Application No. 201180076104.5, dated Sep. 4, 2017, 4 pages of Chinese Notice of Allowance including 2 pages of English Translation.

Office Action and Search Report Received for Chinese Patent Application No. 201180076104.5, dated Oct. 31, 2016, 27 pages of Chinese Office Action including 14 pages of English Translation.

* cited by examiner

B = 7, 2, 7, 1, 7
elements_left_mask = 1 1 1 1 1    330
indices_having_dependency_relationship = vconflict (b, b)    300
indices_having_dependency_relationship =

| 10101 | 01000 | 10101 | 00010 | 10101 |
|---|---|---|---|---|
| 302 | 303 | 304 | 305 | 306 | order_of_dependency_mask =

| 01111 | 00111 | 00011 | 00001 | 00000 |
|---|---|---|---|---|
| 314 | 313 | 312 | 311 | 310 |

308 {
  conflicted_out_indices ←--- vptest (indices_having_dependency_relationship; order_of_dependency_mask)
  conflicted_out_indices = 1 0 1 0 0
}
307 — ! conflicted_out_indices = 0 1 0 1 1
331 — indices_permitted_for_execution = 0 1 0 1 1

S = gather (A[indices_permitted_for_execution])
T = vector operation on S                          } 315
scatter (T; A[indices_permitted_for_execution])

332 — elements_left_mask = conflicted_out_indices = 1 0 1 0 0

| 10101 | 01000 | 10101 | 00010 | 10101 | indices_having_dependency_relationship 301
|---|---|---|---|---|---| conflicted_out indices 308

| 10100 | 10100 | 10100 | 10100 | 10100 |
|---|---|---|---|---| indices_having dependency_relationship 316 =

| 10100 | 00000 | 10100 | 00000 | 10100 | = vpand (indices_having_dependency_relationship; conflicted_out_indices)
|---|---|---|---|---|---|

317 — conflicted_out_indices = 1 0 0 0 0 ←-- vptest (indices_having_dependency_relationship; order_of_dependency_mask)
! conflicted_out_indices = 0 1 1 1 1
333 — indices_permitted_for_execution = 0 0 1 0 0

FIG. 3

```
S = gather (A[indices_permitted_for_execution])  ⎫
T = vector operation on S                          ⎬ 319
scatter (T; A[indices_permitted_for_execution])   ⎭
```

334 — elements_left_mask = conflicted_out_indices = 1 0 0 0 0

| 10101 | 00000 | 10100 | 00000 | 10100 | ← 316 conflicted_out indices 317 —

| 10000 | 10000 | 10000 | 10000 | 10000 | indices_having dependency_ relationship 320 =

| 10000 | 10000 | 10000 | 10000 | 10000 | vpand (indices_having_ dependency_relationship; conflicted_out_ indices)

321 — conflict_out_indices = 0 0 0 0 0 ◄--- vptest (indices_having_dependency_ relationship;conflicted_out_indices)

! conflicted_out_indices = 1 1 1 1 1
335 — indices_permitted_for_execution = 1 0 0 0 0

```
S = gather (A[indices_permitted_for_execution])  ⎫
T = vector operation on S                          ⎬ 323
scatter (T; A[indices_permitted_for_execution])   ⎭
```

336 — elements_left_mask = conflicted_out_indices = 0 0 0 0 0

*FIG. 3 (Continued)*

PERFORM BIT WISE AND OF BLOCK
OF n BITS AGAINST EACH ELEMENT
OF AN INPUT VECTOR, EACH ELEMENT
OF THE INPUT VECTOR HAVING n BITS

*FIG. 6*

VECTOR
PERMUTE
OPERATION
962
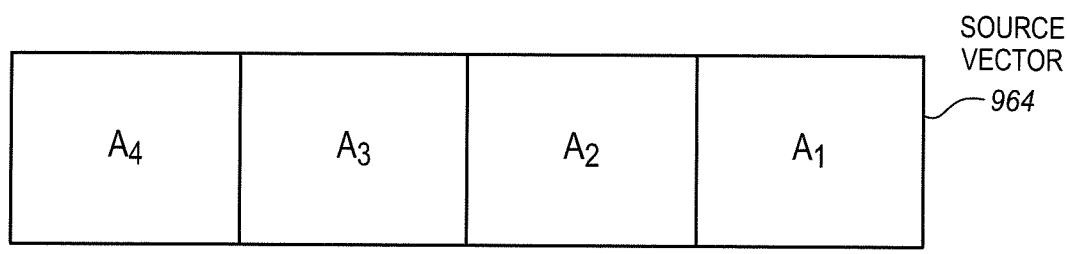
SOURCE VECTOR
964
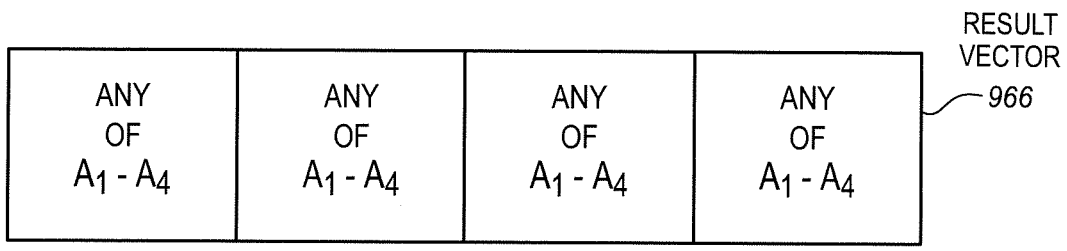
RESULT VECTOR
966
FIG. 9

PROCESSORS HAVING FULLY-CONNECTED INTERCONNECTS SHARED BY VECTOR CONFLICT INSTRUCTIONS AND PERMUTE INSTRUCTIONS

CROSS-REFERENCE TO RELATED APPLICATION

This patent application is a U.S. National Phase Application under 35 U.S.C. § 371 of International Application No. PCT/US2011/067982, filed Dec. 29, 2011, PROCESSORS HAVING FULLY-CONNECTED INTERCONNECTS SHARED BY VECTOR CONFLICT INSTRUCTIONS AND PERMUTE INSTRUCTIONS.

FIELD

The field of invention relates generally to the computing sciences, and, more specifically, to execution logic of processors.

BACKGROUND

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 1A and 1B present a comparative example that demonstrates the basic difference between a scalar processor and a vector processor.

FIG. 1A shows an example of a scalar AND instruction in which a single operand set, A and B, are ANDed together to produce a singular (or "scalar") result C (i.e., AB=C). By contrast, FIG. 1B shows an example of a vector AND instruction in which two operand sets, A/B and D/E, are respectively ANDed together in parallel to simultaneously produce a vector result C, F (i.e., A.AND.B=C and D.AND.E=F).

As is well known in the art, typically, both input operands and output result are stored in dedicated registers. For example, many instructions will have two input operands. Therefore two distinct input registers will be used to temporarily store the respective input operands. Moreover, these same instructions will produce an output value which will be temporarily stored in a third (result) register. Respective input 101a,b and 102a,b and result registers 103a,b are observed in FIGS. 1A and 1B. Notably, the "scalar" vs. "vector" characterizations are readily discernable.

That is, input registers 101a and 102a of the scalar design of FIG. 1A are observed holding only scalar values (A and B, respectively). Likewise, the result register 103a of the scalar design of FIG. 1A is also observed holding only a scalar value (C). By contrast, the input registers 101b and 102b of the vector system of FIG. 1B are observed holding vectors (A,D in register 101b and B,E in register 102b). Likewise, the result register 103b of the vector system of FIG. 1B is also observed holding a vector value (C,F). As a matter of terminology, the contents of each of the registers 101b, 102b and 103b of the vector system of FIG. 1B can be globally referred to as a "vector", and, each of the individual scalar values within the vector can be referred to as an "element". Thus, for example, register 101b is observed to be storing "vector" A, D which is composed of "element" A and "element" D.

Given that vector operations correspond to the performance of multiple operations performed in parallel, a problem can arise in vector operations when one operation on an element of an input vector has a dependency on another operation performed on another element within the same input vector.

BRIEF DESCRIPTION OF THE DRAWINGS

The present invention is illustrated by way of example and not limitation in the figures of the accompanying drawings, in which like references indicate similar elements and in which:

FIG. 3 shows a pseudo code representation of an embodiment of the methodology of FIG. 2;

FIG. 6 is a block diagram of the methodology of a vpand instruction;

FIG. 9 is a block diagram of an example embodiment of a vector permute operation.

DETAILED DESCRIPTION

Recall from the background that a problem can rise in vector operations when one operation on an input vector element has a dependency on another operation performed on another element of the same input vector. An instance where this specific problem can arise is with the use of "gather" and "scatter" instructions.

A gather instruction, for example, helps construct an input vector for a subsequent vector operation by "gathering" data values specified by the indices of a data array. For example, if a data array "A" has 100 entries, a gather instruction of the form "gather A[15; 34; 66; 78]" will fetch the data values in the $15^{th}$, $34^{th}$, $66^{th}$ and $78^{th}$ index positions of array A. The fetched data values can then be used to form the data elements of an input vector for the vector operation. A "scatter" instruction can be viewed as the reverse of the "gather" instruction. Specifically, a scatter instruction of the form scatter A[15; 34; 66; 78] will store values (e.g., respective elements of an output vector produced by a vector operation) to the $15^{th}$, $34^{th}$, $66^{th}$ and $78^{th}$ index positions of array A.

Thus, an instruction sequence of the form
S<=gather A[a;b;c;d];
T<=vector operation on S;
scatter (A[a;b;c;d]; T)
will: 1) fetch data operands from the a, b, c and d index positions of A; 2) perform a vector operation on these operands; and, 3) store the elements of the result respectively in the a, b, c and d index positions of A.

In some cases, the set of index values that are provided to the gather (and scatter) instructions reflect dependencies within the vector operation. For example, an instruction sequence of the form
S<=gather A[a;b;c;a];
T<=vector operation on S;
scatter (A[a;b;c;a]; T)
may reflect that the vector operation performed on the leftmost A[a] value has a dependency on the result of the vector operation performed on the rightmost A[a] value. That is, correct operation corresponds to: 1) operation (rightmost A[a])=>R; 2) operation(R). If precautions regarding the data dependency are not taken, an incorrect result may be obtained. Specifically, in this example, the final result for A[a] will be operation(A[a]) and not operation(R).

Figure 1A:
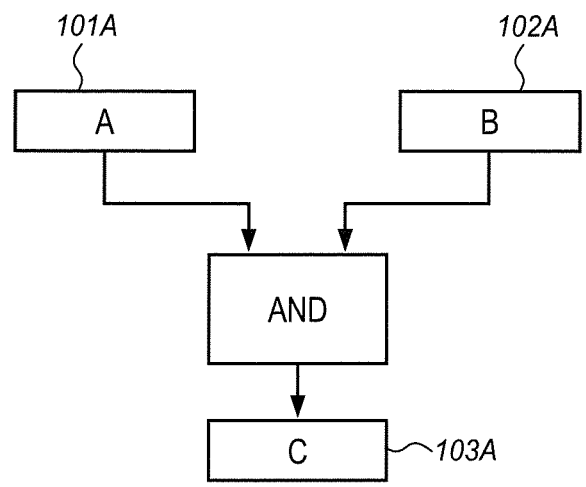
FIG. 1a,b compare scalar v. vector processing.
Figure 1B:
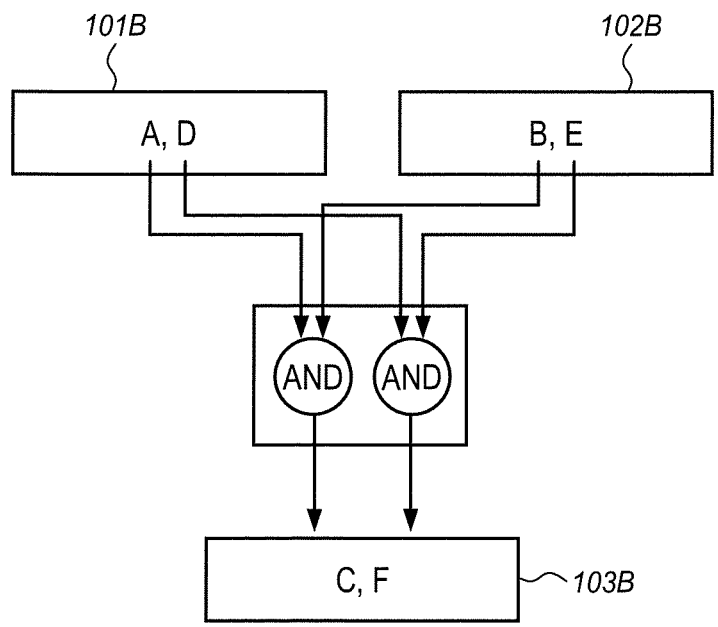
Figure 2:
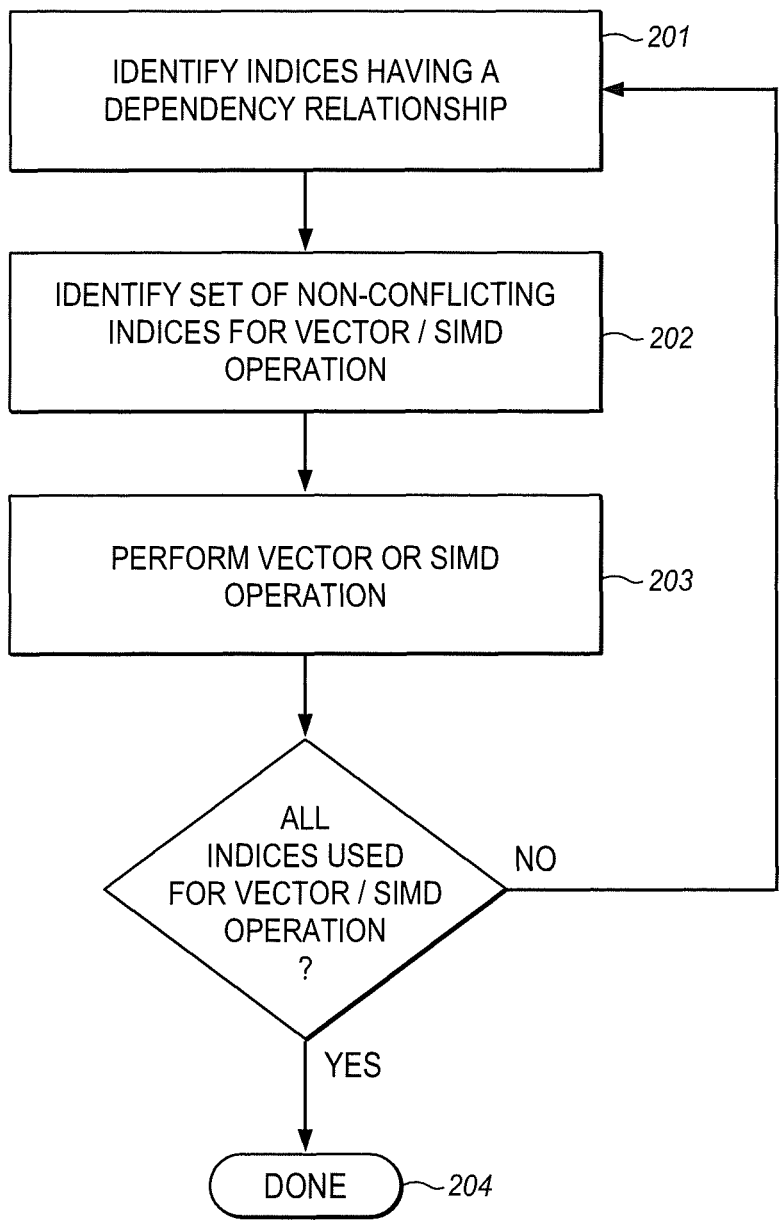
FIG. 2 shows a methodology according to an embodiment that can be performed with instructions designed to detect vector conflicts.

FIG. 2 provides a methodology that can be used to successfully account for dependencies when dependencies are identified within an input vector for a vector operation. Specifically, the methodology of FIG. 2 will properly refrain from simultaneously performing the operation on the same operand within the same input vector (e.g., identified by at least two same valued indices). Instead, the operation will be separately performed in a sequence of cycles, where each cycle is executed for each separate instance of the index value that appears multiple times.

For instance, if the same index value appears three times for the input vector, the vector operation will be performed three times. In this manner the data dependencies are respected because the second operation uses the result of the first operation as an input operand, and, the third operation uses the result of the second operation as an input operand.

Figure 4A:
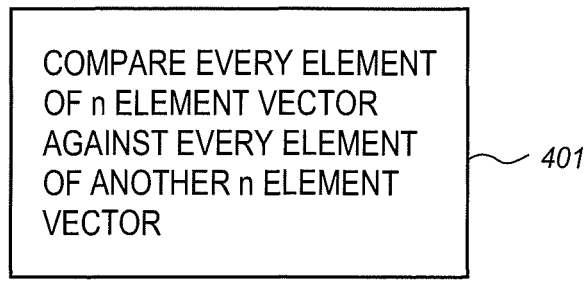
FIG. 4a,b pertain to a first embodiment of a vector conflict instruction.

FIG. 3 shows a pseudo code flow of an embodiment of the methodology of FIG. 2. FIGS. 4a,b through 6a,b show additional details to assist the discussion of the pseudo code flow of FIG. 3. Referring to FIG. 2, initially, indices having a dependency relationship are identified 201. Here, indices having a dependency relationship may correspond to, as described above, same indices of an array that define different elements of a same input vector. Referring to FIG. 3, the indices of the array are specified as b=7, 2, 7, 1, 7. As such, there are three indices having a dependency relationship because the rightmost, middle and leftmost index values each have the same value (7). Another initial control vector is the elements_left_mask 330 which represents the elements of b that have not yet been used for a gather/vector operation/scatter process sequence. At the start of the flow, elements_left_mask=1 1 1 1 1 which indicates all five elements of b have not yet been processed.

Figure 4B:
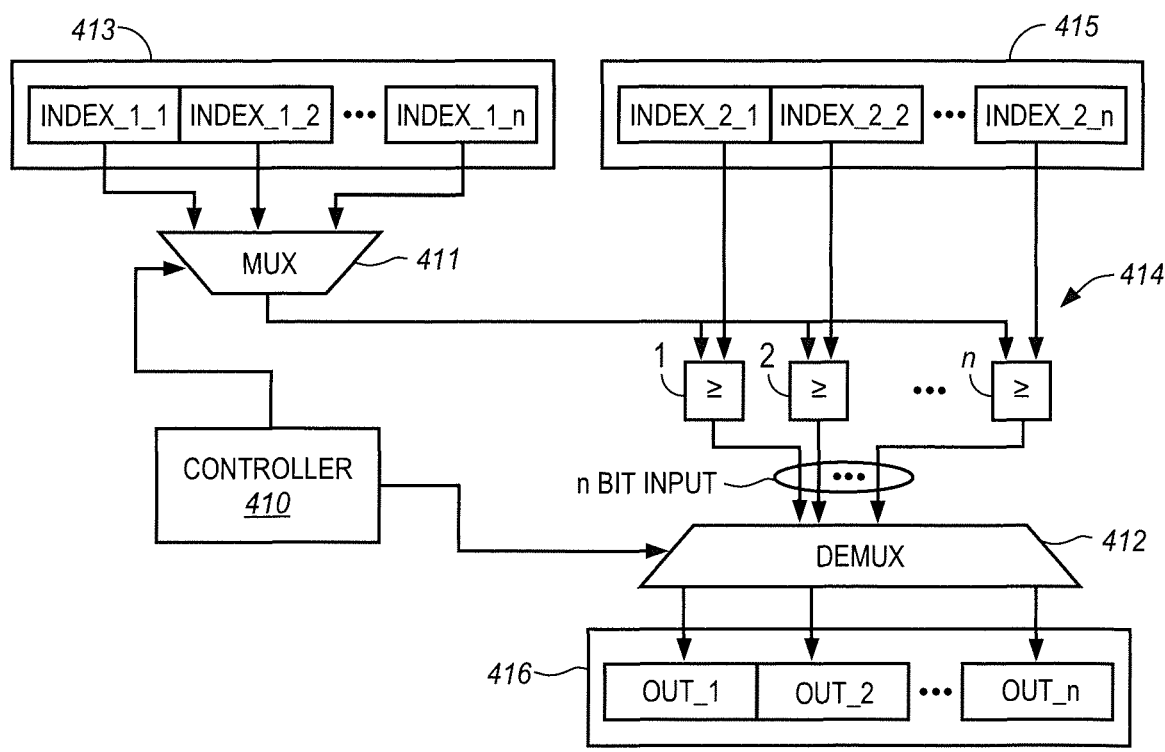

The pseudo code of FIG. 3 shows that execution of the vconflict(b, b) instruction 300 provides an indices_having_dependency_relationship data structure 301. FIG. 4a shows a methodology 401 of the vconflict(b, b) instruction and FIG. 4b shows a hardware logic design that can be designed into a semiconductor chip to perform the vconflict (b, b) instruction. As observed in FIGS. 4a and 4b, the vconflict(b,b) instruction compares each element of an input vector with every element of another input vector and provides the result of each comparison 401. In the pseudo code methodology of FIG. 3, the vconflict(b, b) instruction executes with the same vector (b) for both inputs.

The hardware design of FIG. 4b may be attempted with a micro-coded and/or state machine approach that dictates operation of controller 410 so that the respective channel selects of multiplexer 411 and de-multiplexer 412 operate in correct unison. Specifically, controller 410 multiplexes a specific one of the index values of the left index register 413 into the comparator stem 414. The comparator stem 414 compares the selected index value with every index value in the right index register 415. The de-multiplexer 412 directs the output of the comparator stem 414 to the segment of the output register 416 that is aligned with the selected value of the left index register 413. In an alternate approach, the comparator stem may have nxn comparators so that no multiplexer, de-multiplexer or controller are needed (i.e., a separate comparator exists for each bit of the comparison result presented in the output register 416).

Referring to the indices_having_dependency_relationship data structure 301 of FIG. 3, note that the left most segment 302 of data structure 301 provides the comparison results when the leftmost value of b is individually compared against every value of b. Notably, five results are presented in the segment 302 (one for each value of b), and the results within the segment 302 are respectively aligned with the values of b. As such, the leftmost segment 302 of data structure 301 is "10101" which shows that the leftmost value of b has a dependency relationship with the rightmost value of b, the middle value of b and itself (the leftmost value of b). Segment 303 of data structure 301 corresponds to the comparison of the second to leftmost value of b (2) and shows that the value of 2 has no dependency relationships in b other than itself (i.e., segment 302 is 01000). Segment 304, having a value of 10101, indicates that the middle value of b (7) has a dependency relationship with itself and the leftmost and rightmost values of b. Segment 305, having a value of 00010, indicates that the second rightmost value of b only has a dependency relationship with itself. Segment 306, having a value of 10101, indicates that the rightmost value of b (7) has a dependency relationship with the leftmost and middle values of b as well as with itself.

Returning to FIG. 2, once indices having dependency relationships have been identified (e.g., as represented in the indices_having_dependency_relationship data structure 301 of FIG. 3), a set of non conflicting indices are identified for a subsequent vector operation. In the pseudo code example of FIG. 3, the set of non conflicting indices is represented in the indices_permitted_for_execution data structure 331. Here, the indices_permitted_for_execution data structure 331 is constructed, at least in part, by performing a logical operation with the indices_having_dependency_relationship data structure 301 and an order_of_dependency_mask 309.

The order_of_dependency_mask 309 articulates the order in which indices having a dependency relationship should be processed. In the particular example of FIG. 3, dependencies are ordered right to left such that a rightmost index having a dependency relationship is used first for the vector operation, then, the next rightmost index of the dependency relationship is used for a subsequent vector operation cycle, etc. Said another way, the indices having dependency relationships are chosen for each vector operation in order from right to left across b. For the specific value of b=7, 2, 7, 1, 7 of the present example, this corresponds to the rightmost value of 7 being used for the first gather/vector operation/scatter iteration, the middle value of 7 being used for the second gather/vector operation/scatter iteration, and, the leftmost value of 7 being used for the third gather/vector operation/scatter iteration.

The order_of_dependency mask 309 reflects this order with 1s positioned "to the right" of a segment's respective position within the mask 309. That is, segment 310 represents the rightmost value of b. With the ordering rules described above (right value executed before left value in the dependency sequence), the rightmost value will not have any dependencies (even though it is involved in a dependency relationship) that delay its use for vector operation (i.e., it is executed with the first operation cycle). As such, the value of segment 310 is 00000. The second segment 311 reflects that, if the second rightmost value of b has a dependency within b, the dependency will be on the rightmost value of b. As such, its value is 00001. The third segment 312 reflects that, if the middle value of b has a dependency within b, the dependency will be on the second rightmost and/or rightmost values of b. As such, its value is 00011. The fourth segment 313 reflects that, if the second leftmost value of b has a dependency within b, it will be on the middle, second rightmost, and/or rightmost values of b. As such, its value is 00111. The fifth segment 314 reflects that, if the leftmost value of b has a dependency within b, it will be on the second leftmost, middle, second rightmost and/or rightmost values of b. As such, its value is 01111.

Recall that the indices_permitted_for_execution data structure 331 is constructed in the example of FIG. 3, at least in part, by performing a logical operation with the indices_having_dependency_relationship data structure 301 and the order_of_dependency_mask 309. Here, a conflicted_out_indices data structure 308 is constructed by executing a vptest instruction that accepts the indices_having_dependency_relationship data structure 301 and the order_of_dependency_mask 309 as inputs.

Figure 5A:
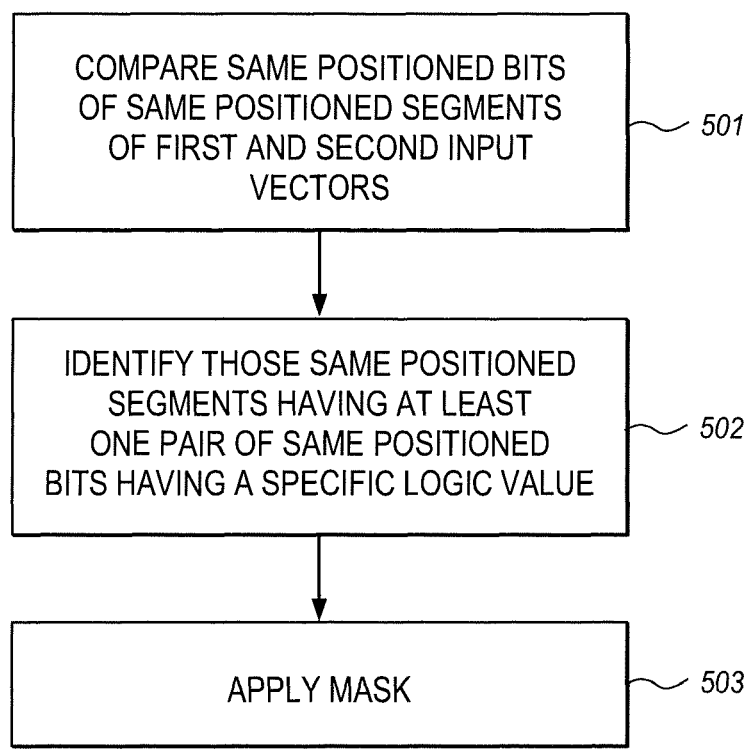
FIG. 5a is a block flow diagram of the operation of a vptest instruction.
Figure 5B:
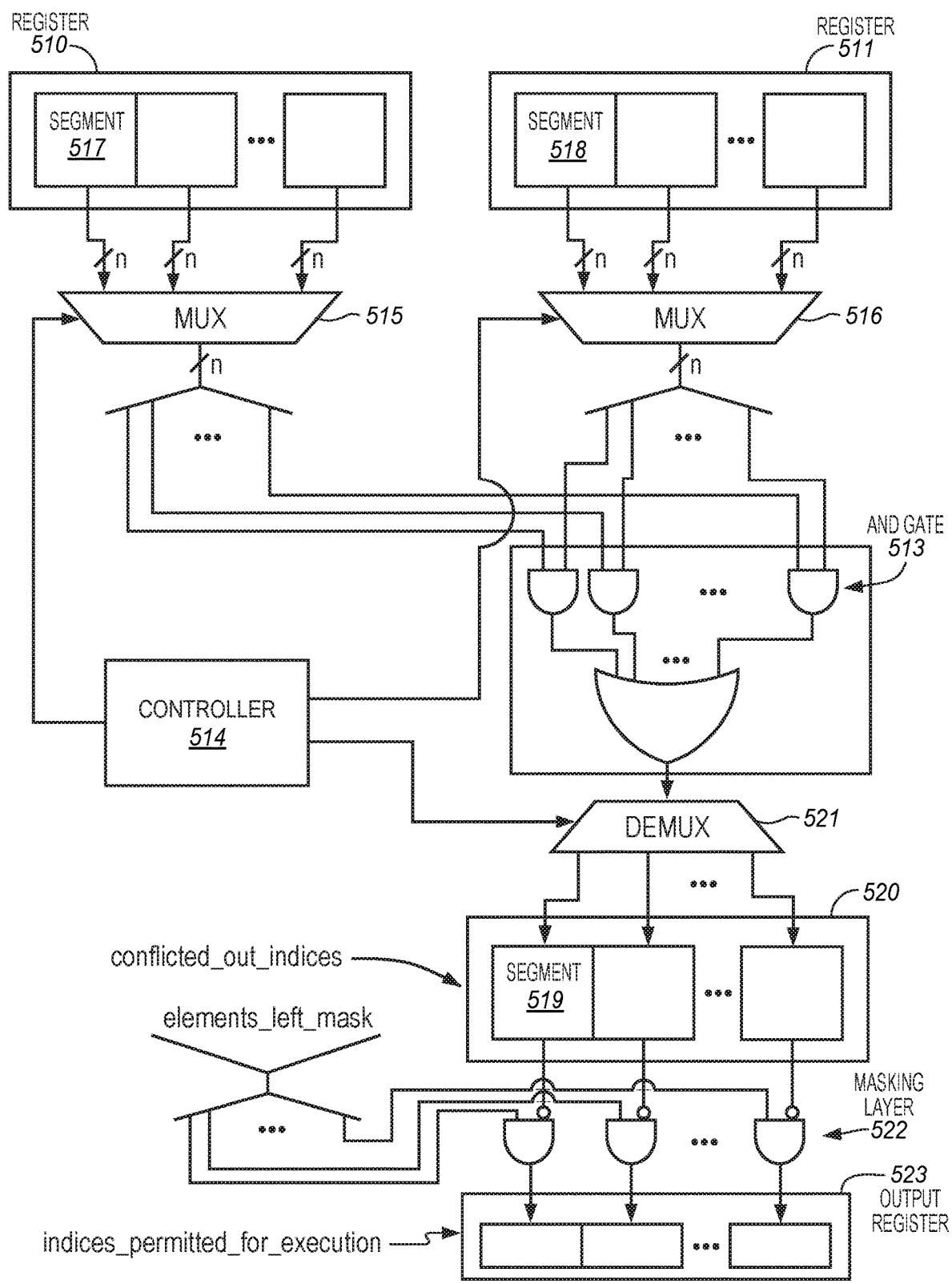
FIG. 5b is a block diagram of a hardware design for a vptest instruction that includes registers, multiplexers and AND gates.

An embodiment of the operation of the vptest instruction and an embodiment of a hardware design for the vptest instruction is provided in FIGS. 5a and 5b, respectively. Here, referring to FIG. 5a, same positioned bits of same positioned segments of two input vectors are compared 501. Segments having at least one set of same positioned bits having a same logic value are identified 502, and, a mask is applied 503.

Referring to FIG. 5b, a first input vector is placed in register 510 and a second input vector is placed in register 511. Pairs of bits having the same location within their respective segments of the two vectors are ANDed with AND gates 513. If any of the AND gates produce a 1, a 1 is registered in the segment of the output 520 that corresponds to the same positioned segments whose bits were compared. For example, controller 514 will cause multiplexers 515, 516 to select the bits of segments 517 and 518. Here, each of segments 517 and 518 correspond to the leftmost segments of their respective vectors within registers 510, 511 and therefore are positioned the same within their respective vectors. Same positioned bits of segments 517 and 518 are ANDed by AND gates 513. If any pair of ANDed bits are each of value 1, then, a 1 will be recorded in segment 519 of register 520 (via controller 514 control of the channel select of demultiplexer 521). A masking layer 522 is then applied against the contents of register 520 to produce output 523.

For the specific pseudo code example of FIG. 3, the indices_having_dependency_relationship data structure 301 is placed in register 510 and the order_of_dependency_mask 309 is placed in register 511. The operation of the vptest circuit design of FIG. 5b as described above for these input vectors produces the conflicted_out_indices data structure 308 in register 520. The conflicted_out_indices data structure 308 identifies which indices are conflicted out of the upcoming vector operation cycle owing to dependencies within b. As observed in FIG. 3, the conflicted_out_indices data structure 308 has a value of 10100 which indicates that the middle and leftmost index values of b are not to be executed in the upcoming vector operation because of a dependency (which happens to be the rightmost index value of b). The logical inverse of the conflicted_out_indices data structure 314 (!_conflicted_out_indices data structure 307) is then masked against the elements_left_mask 330. In the initial iteration, the elements_left_mask is 1 1 1 1 1. As such, the conflicted_out_indices vector in register 520 is presented as the indices_permitted_for_execution vector 331 in output register 523.

Returning to FIG. 2, the vector operation is then performed 203 on the indices that are permitted for execution. The pseudo code example of FIG. 3 again refers to a gather, vector operation, scatter instruction sequence 315. As such, FIG. 3 shows: i) a gather operation that selects the values of A identified by the indices_permitted_for_execution data structure 331; ii) a vector operation being performed on the gathered values of A; and, iii) a scatter operation that stores the results of the vector operation back into the indices identified in data structure 331. The vector operation can essentially be any vector operation.

Referring to FIG. 2, if all of the indices of b have been used for the vector operation the process is complete 204, else, the indices having a dependency relationship are re-determined 201. In the embodiment of FIG. 3, the elements_left_mask is updated 332 by redefining it as the elements that were conflicted out of the most recent gather/vector operation/scatter sequence. In this case, the new elements_left_mask 332 corresponds to a value of 1 0 1 0 0 which indicates that, because the middle and leftmost values of b were not used in the last gather/vector operation/scatter sequence, they still are still "left" for processing. Hence processing is not complete and another iteration needs to be performed. The execution of the first of the index values involved in a dependency relationship (the rightmost index value) results in a change in the dependency relationship among the index values of b. Specifically, because the rightmost index value of b has been used for vector operation, vector operation with the middle index value of b no longer needs to be delayed. The indices_having_dependency_relationship data structure 301 is therefore updated to reflect this change.

In the embodiment of FIG. 3, the indices_having_dependency_relationship data structure 301 is updated by executing a vpand instruction that accepts the indices_having_dependency_relationship data structure 301 and the conflicted_out_indices data structure 308 as inputs. An embodiment of the methodology of the vpand instruction is observed in FIG. 6. As observed in FIG. 6, the vpand instruction accepts a first block of n bits and a vector having multiple elements each having n bits. A bitwise AND of the first block of n bits against each element in the vector is then performed.

Referring to FIG. 3, the block of n bits for the vpand instruction corresponds to the conflicted_out_indices data structure 308, and, the input vector of the vpand instruction corresponds to the indices_having_dependency_relationship data structure 301. When the conflicted_out_indices data structure 308 is bitwise ANDed against each of the elements within the indices_having_dependency_relationship data structure 301, a new indices_having_dependency_relationship data structure 316 is produced. Here, the bitwise AND with the conflicted_out_indices data structure 308 has the effect of dropping the rightmost index of b from the indices_having_dependency_relationship information. Said another way, as reflected by the 0 in the rightmost location of the conflicted_out_indices data structure 308, the rightmost index value of b was permitted to be executed in the first vector operation 315. As such it is no longer part of an existing dependency relationship. The logical AND performed by the vpand instruction identifies those indices that had a dependency on the execution of the rightmost index of b—a next one of which is free to be used with the next vector operation.

As such, another execution of the vptest instruction with the new indices_having_dependency_relationship data structure 316 (and the original order_of_dependency_mask 309) produces a new conflicted_out_indices data structure 317. Unlike the initial sequence, however, the vptest instruction's output mask with the elements_left_mask 332 will cause the output of the vptest instruction to be something other than the logical inverse of the conflicted_out_indices data structure 317. Specifically, the new indices_permitted_for_execution 333 will have a value of 00100 which corresponds to the next conflicted index of b less the indexes of b that have already been executed. As such, a next gather, vector operation, scatter instruction sequence is performed 319 with only the middle index of b. Referring briefly back to FIG. 2, at this point, a second run through process 202 has just been completed.

After completion of the operation 319, however, from a check on the newly updated elements_left_mask 334, all of the indices of b have still not yet been used for the gather/vector operation/scatter process. As such, the dependency relationships amongst the indices of b still need further examination.

Like before, the indices_having_dependency_relationship data structure is updated by executing a vpand(indices_having_dependency_relationship; conflicted_out_indices) instruction with the latest indices_having_dependency_relationship and conflicted_out_indices data structures 316, 317 being used as inputs. The result is another new indices_having_dependency_relationship data structure 320. Here, the logical AND performed by the vpand instruction identifies those indices that had a dependency on the execution of the middle index of b—the next one of which (i.e., the leftmost index of b) is free to be used with the next vector operation.

As such, another execution of the vptest instruction with the new indices_having_dependency_relationship data structure 320 (and the original order_of_dependency_mask 309) produces another new conflicted_out_indices data structure 321. A mask of the updated elements_left_mask 334 against the logical inverse of data structure 321 corresponds to another new indices_permitted_for_execution data structure 335 10000. The new indices_permitted_for_execution data structure 335 indicates that only the leftmost index of b needs to be processed for the next gather/vector operation/scatter sequence. Referring briefly back to FIG. 2, at this point, a third run through process 202 has just been completed.

As such, a final gather, vector operation, scatter instruction sequence is performed 323 with only the leftmost index of b being used. With the subsequent update of the elements_left_mask 336 to a value of 00000, no other loops are required and execution is complete.

Referring to the pseudo code of FIG. 3, note that, as represented by the initial vconflict(b,b) instruction 300, this particular example is geared to a situation in which conflicts are detected in a same vector (in this case, vector b). More generally, one or more sets of indices may be used to create the input vector for a vector operation (such as the input vector for a gather/vector operation instruction sequence as observed in FIG. 3). Similarly, one or more sets of indices may be used to write the output vector to memory (such as in the scatter in FIG. 3). Conflicts between indices used to construct an input vector and/or to write the output vector to memory can be detected between vectors where the vectors may be the same or different. Again, FIG. 3 demonstrates an example where the vectors are the same (b and b). In other situations, however, conflicting indices may be detected by comparing different vectors (e.g., vconflict(b,c)). For example, a first vector (e.g., b) may be used as the basis for constructing the input vector for the subsequent vector operation, while, another vector (e.g., c), may be used as the basis for scattering the results of the vector operation to memory. As such, it should be understood that the vconflict instruction can be used with same or different input vectors.

Figure 7:
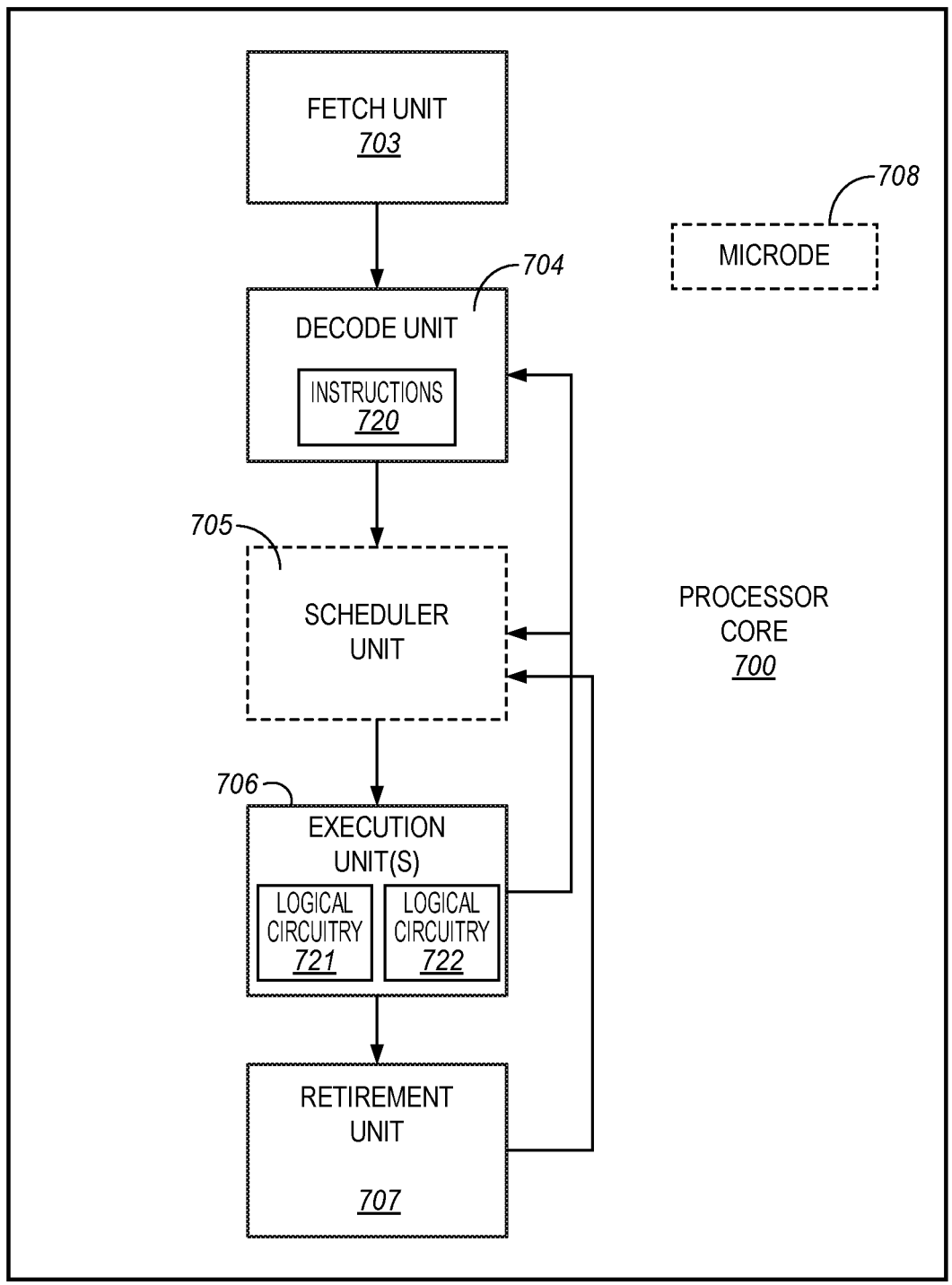
FIG. 7 is a block diagram of an embodiment of a processor core that includes a fetch unit, a decode unit, execution unit(s) and a retirement unit.

FIG. 7 shows a generic processor core 700 that is believed to describe many different types of processor core architectures such as Complex Instruction Set (CISC), Reduced Instruction Set (RISC) and Very Long Instruction Word (VLIW). The generic processor core 700 of FIG. 7 includes: 1) a fetch unit 703 that fetches instructions (e.g., from cache or memory); 2) a decode unit 704 that decodes a plurality of instructions 720; 3) a scheduler unit 705 that determines the timing and/or order of instruction issuance to the execution unit(s) 706 (notably the scheduler is optional); 4) execution unit(s) 706 that execute the instructions; 5) a retirement unit 707 that signifies successful completion of an instruction. Notably, the processor core may or may not include microcode 708, partially or wholly, to control the micro operations of the execution unit(s) 706.

Notably, the execution unit(s) are capable of executing vconflict, vptest and vpand instructions. The logical circuitry 721 and 722 to support these instructions may be dispersed across different execution units, included in a same execution unit, or at least two of the instructions may be capable of execution from a single execution unit. The execution units also support vector instructions. The execution units may also be capable of supporting gather and scatter instructions.

One factor that tends to limit the widespread inclusion of vector conflict instructions in instruction set architectures is that it tends to be challenging to implement them efficiently. The implementation of vector conflict instructions tends to involve a relatively large number of comparisons. For example, some vector conflict instructions compare every element of an input or source vector against every other element of the same source vector. Other vector conflict instructions compare every element of one source vector against every element of a different source vector. Especially in implementations where the number of data elements being compared is relatively high (e.g., at least eight), this involve a relatively large number of comparisons. Moreover, over time the width of vector registers and the number of data elements stored therein tends to increase. As a result, significant levels of routing of elements tend to be needed in order to allow such comparisons to be made. Providing extensive interconnects to perform such routing and/or comparison of elements in parallel or concurrently tends to significantly increase the area, cost, and power consumption of the circuitry to implement the vector conflict instructions. Conversely, performing such routing and/or comparison of elements in series (e.g., through multiple microinstructions) tends to take a significant amount of processing time. Disclosed below are additional ways to implement vector conflict instructions quickly and efficiently.

Figure 8:
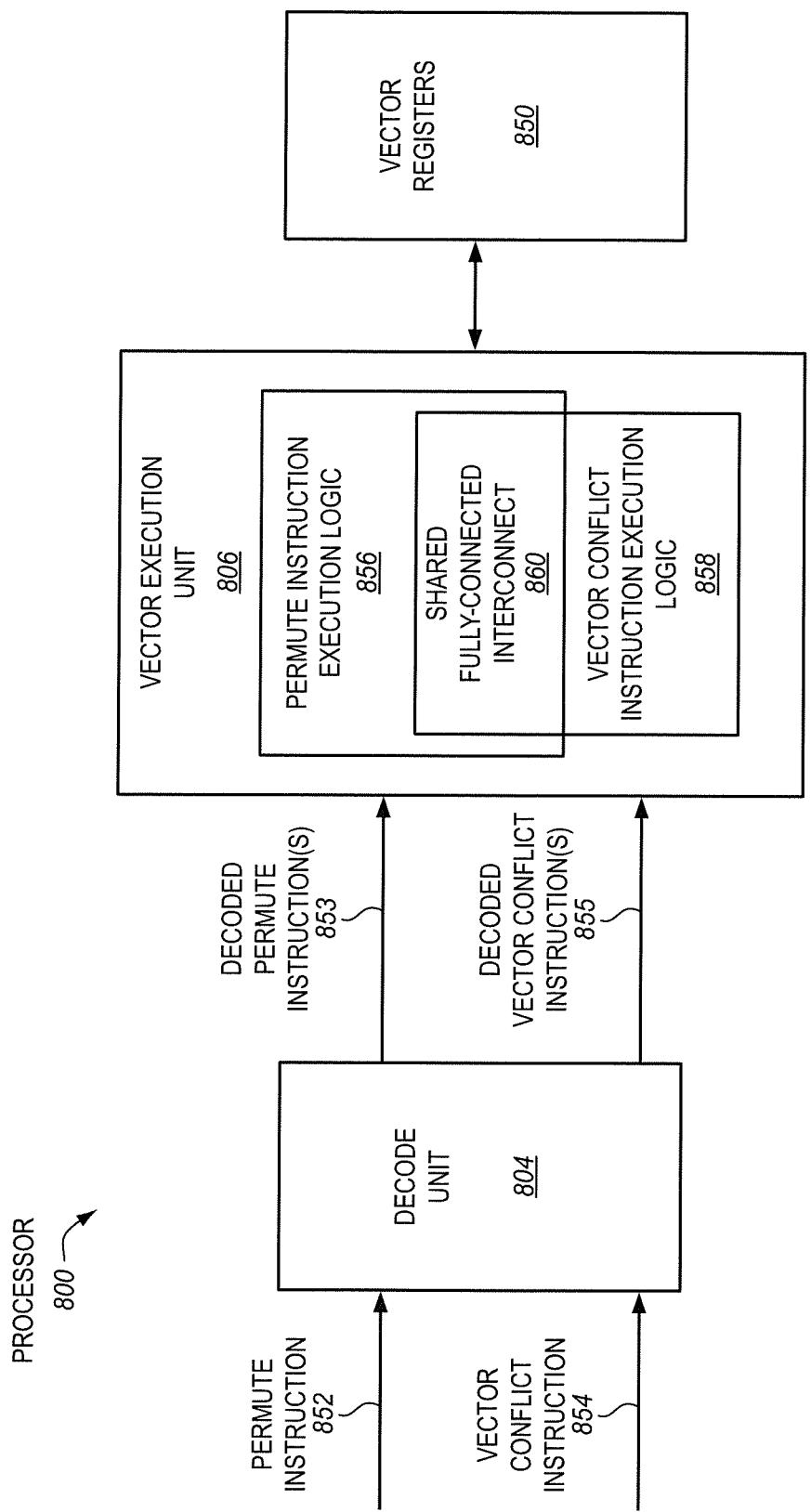
FIG. 8 is a block diagram of an example embodiment of a processor having a vector execution unit that includes permute instruction execution logic and vector conflict instruction execution logic that share a fully-connected interconnect.

FIG. 8 is a block diagram of an example embodiment of a processor 800 having a vector execution unit 806 that includes permute instruction execution logic 856 and vector conflict instruction execution logic 858 that share a fully-connected interconnect 860. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor (e.g., a general-purpose microprocessor of the type used in desktop, laptop, and like computers), although this is not required. Alternatively, the processor may be a special-purpose processor. Examples of suitable special-purpose processors include, but are not limited to, graphics processors, network processors, communications processors, cryptographic processors, co-processors, embedded processors, digital signal processors (DSPs), and controllers (e.g., microcontrollers), to name just a few examples. The processor can be included in computer systems, servers, cell phones, set top boxes, and various other electronic devices having one or more processors. In some cases the systems have memory (e.g., dynamic random access memory (DRAM)).

The processor includes a decode unit 804. During operation, a permute instruction 852 and a vector conflict instruction 854 may be provided to the decode unit. The permute instruction and the vector conflict instruction may be included in a code sequence along with one another and may be received in any order either at approximately the same time or at entirely different times. The permute and vector conflict instructions may represent machine instructions, macroinstructions, or control signals that is recognized by the processor (e.g., by the decoder). The instruction processing apparatus may have specific or particular logic (e.g., hardware, firmware, software, or some combination (e.g., hardware potentially with some firmware and/or software) that is operable to process the instructions.

The decode unit is operable to decode the permute instruction and is operable to decode the vector conflict instruction. The decode unit may decode each of the received higher level machine instructions into one or more decoded instructions. In particular, the decode unit may decode the permute instruction into one or more decoded permute instructions 853, and the decode unit may decode the vector conflict instruction into one or more decoded vector conflict instructions 855. The one or more decoded instructions may represent one or more lower-level micro-operations, micro-code entry points, microinstructions, or other lower-level instructions or control signals, which reflect and/or are derived from the received higher-level instructions. The one or more lower-level instructions or control signals may implement the operation of the higher-level instruction through one or more lower-level (e.g., circuit-level or hardware-level) operations. The decode unit may be implemented using various different mechanisms. Examples of suitable mechanisms include, but are not limited to, microcode read only memories (ROMs), look-up tables, hardware implementations, programmable logic arrays (PLAs), other mechanisms used to implement decode units known in the art, etc.

Alternatively, rather than having the decode unit 804, in one or more other embodiments, an instruction emulator, translator, morpher, interpreter, or other instruction conversion logic may be used instead. Various different types of instruction conversion logic are known in the arts and may be implemented in software, hardware, firmware, or a combination thereof. The instruction conversion logic may receive the vector conflict and/or permute instructions, emulate, translate, morph, interpret, or otherwise convert them into one or more corresponding derived instructions or control signals. In still other embodiments, the instruction processing apparatus may have both a decode unit and additional instruction conversion logic. For example, the instruction processing apparatus may have instruction conversion logic to convert each of the vector conflict and permute instructions into one or more derived instructions, and a decode unit to decode the derived instructions into one or more lower-level instructions or control signals executable by native hardware of the processor Some or all of the instruction conversion logic may be located off-die from the rest of the processor, such as on a separate die or in an off-die memory.

The vector execution unit 806 has an input that is coupled with an output of the decode unit 804. The decoded permute instruction(s) 853 and the decoded vector conflict instruction(s) 855 may each be provided to the vector execution unit. In other words, both the decoded permute instruction(s) and the decoded vector conflict instruction(s) are provided to the same vector execution unit. The vector execution unit is operable to execute or process both the decoded permute instruction(s) and the decoded vector conflict instruction(s). In various embodiments, the vector execution unit may include a vector arithmetic logic unit, a vector logic unit, or another vector functional unit. For example, the vector execution unit is operable, in response to and/or as a result of the permute instruction, to store a result in a destination storage location (e.g., a register in vector registers 850 or another architecturally visible storage location) indicated by the permute instruction, in which the result includes data elements from one or more source vectors that have been permuted, shuffled, or rearranged as specified by the permute instruction. As another example, the vector execution unit is operable, in response to and/or as a result of the vector conflict instruction, to store a result in a destination storage location (e.g., a register in vector registers) indicated by the vector conflict instruction, in which the result includes results of inter-element comparisons performed on elements of one or more source vectors (e.g., an indices_having_dependency_relationship data structure 301 as shown and described above in FIG. 3). The execution unit may include execution logic (e.g., hardware (e.g., integrated circuitry), firmware, software, or a combination (e.g., hardware potentially with some firmware and/or software)) operable to implement the operations of the permute and vector conflict instructions (e.g., execute one or more associated microinstructions for each).

Referring again to FIG. 8, the execution unit includes permute instruction execution logic 856. The execution unit also includes vector conflict instruction execution logic 858. The permute instruction execution logic and the vector conflict instruction execution logic share a fully-connected interconnect 860. The fully-connected interconnect includes at least four interconnect inputs, and at least four interconnect outputs, in which each of the interconnect inputs is interconnected with each of the interconnect outputs. Advantageously, sharing the fully-connected interconnect between the vector conflict instruction execution logic and the permute instruction execution logic may allow both the vector conflict instruction and the permute instruction to be implemented quickly and efficiently, while avoiding a cost, area, and power increase that would tend to occur if each of the vector conflict instruction execution logic and the permute instruction execution logic were deployed in different execution units and/or otherwise used separate dedicated fully-connected interconnects.

The processor also includes the vector registers 850. The vector registers are bi-directionally coupled with the execution unit. The vector registers represent on-board processor storage locations. Each of the vector registers is operable to store a vector (e.g., packed data). The vector registers represent architectural registers. Unless otherwise specified or clearly apparent, the phrases architectural register, register file, and register are used herein to refer to registers that are visible to the software and/or programmer (e.g., software-visible) and/or the registers that are specified by macroinstructions to identify operands. These registers are contrasted to other non-architectural registers in a given microarchitecture (e.g., temporary registers, reorder buffers, retirement registers, etc.). The vector registers may be implemented in different ways in different microarchitectures using well known techniques and are not limited to any known particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof.

To avoid obscuring the description, a relatively simple processor has been shown and described. In other embodiments, the processor may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, or various different combinations thereof. Moreover, other embodiments may have multiple different types of execution units, with at least one of the execution units including permute instruction execution logic and vector conflict instruction execution logic that at least partially share a fully-interconnected interconnect. Still other embodiments may have multiple cores, logical processors, or execution engines. At least one of the cores, logical processors, or execution engines may include permute instruction execution logic and vector conflict instruction execution logic that at least partially share a fully-interconnected interconnect. It is to be understood that there are literally numerous different possible combinations and configurations of different components in processors, and that the scope of the invention is not limited to any known such combination or configuration.

FIG. 9 is a block diagram of an example embodiment of a vector permute operation 962. The vector permute operation may be performed in response to and/or as a result of a permute instruction. Permute instructions are sometimes referred to in the art as shuffle instructions. The permute instruction may explicitly specify or otherwise indicate a source vector 964. By way of example, the source vector may be stored in a source packed data register or a source memory location. The illustrated source vector includes four source data elements, which are labeled $A_1$-$A_4$. The data elements may represent integers, floating point numbers, or other data. A result vector 966 is stored in response to and/or as a result of the permute instruction. By way of example, the result vector may be stored in a destination packed data register or a destination memory location that is explicitly specified or otherwise indicated by the permute instruction. The result includes data elements from the source vector that have been permuted, shuffled, or rearranged as specified by the permute instruction. In particular, in the illustration, each of the result data elements may include any of the source data elements $A_1$-$A_4$. In some embodiments, each of the elements of the result vector may have a corresponding index that points to a data element of the source vector. This is just one illustrative example of a permute instruction. Other permute instructions are known in the art. Other permute instructions may perform permute operations on source vectors and/or result vectors that have more data elements (e.g., eight, sixteen, thirty-two, sixty-four, etc.), with the number of source and result data elements being either the same or different. Moreover, the illustrated vector permute operation is performed on a single source vector, although other permute operations may be performed on data elements from two or more source vectors.

Figure 10:
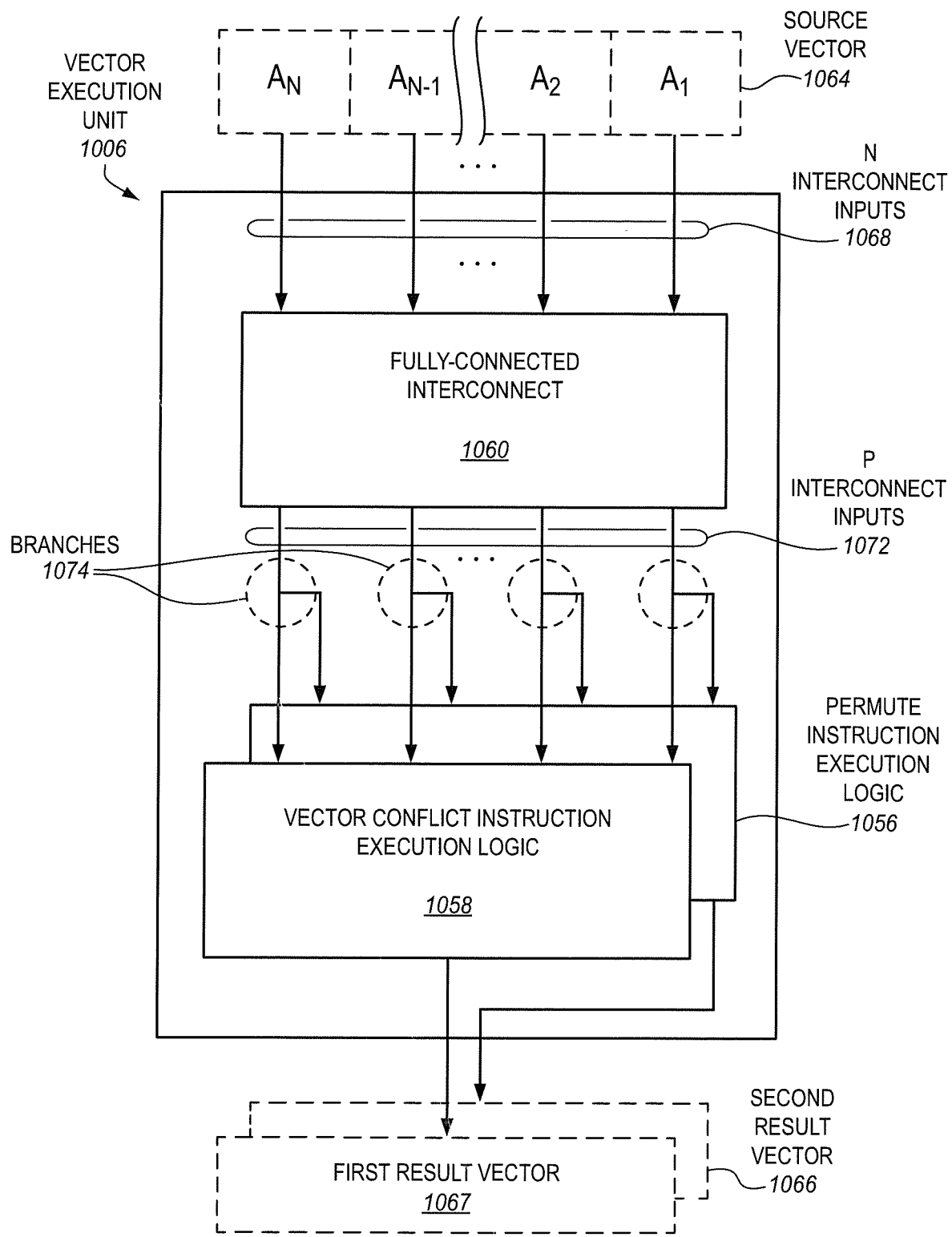
FIG. 10 is a block diagram of an example embodiment of a vector execution unit that includes permute instruction execution logic and vector conflict instruction execution logic that share a fully-connected interconnect.

FIG. 10 is a block diagram of an example embodiment of a vector execution unit 1006 that includes permute instruction execution logic 1056 and vector conflict instruction execution logic 1058 that share a fully-connected interconnect 1060. The vector execution unit is operable to execute both a permute instruction and a vector conflict instruction (e.g., execute microinstructions derived from them). By way of example, the vector execution unit may be a vector arithmetic logic unit (ALU), a vector logic unit, or another type of vector functional unit operable to compare and permute/shuffle data elements.

A source vector 1064 may be input to the vector execution unit. The source vector has N data elements ($A_1$-$A_N$), where N is an integer of at least four. In various example embodiments, N may be 4, 8, 16, 32, or 64. N is not limited to being a power of two, although that is common in practice. The vector execution unit includes the fully-connected interconnect 1060. The fully-connected interconnect has N interconnect inputs 1068, and P interconnect outputs 1072, where N and P are each not necessarily equal integers of at least four. Each of the N interconnect inputs is coupled to receive a different corresponding one of the N data elements ($A_1$-$A_N$). Each of the N data elements may be M-bits wide. In various example embodiments, the M-bits may be 8-bits, 16-bits, 24-bits, 32-bits, 48-bits, or 64-bits. M need not be limited to a power of 2. The fully-connected interconnect is operable to connect each of the N interconnect inputs to each of the P interconnect outputs. For example, all of the N data elements ($A_1$-$A_N$) may be available at each of the P interconnect outputs.

In some embodiments, the fully-connected interconnect is a non-blocking interconnect. In a non-blocking interconnect, any input may be routed to any output without restrictions. A blocking interconnect by comparison has intermediate or layered multiplexing or selection stages that impose restrictions on which inputs may be routed to which outputs. For example, in a blocking interconnect, if a given input is routed to a given output, it may impose restrictions on another input being routed to another output (e.g., an intermediate multiplexer stage may only be able to select one of the two inputs for propagation toward the outputs). This is not the case for a non-blocking interconnect and offers certain advantages for implementation of vector conflict instructions. Alternatively, the interconnect may be a blocking interconnect, and additional interconnections may be added to feed the vector conflict execution logic to accommodate for limitations/restrictions imposed by the blocking nature of the interconnect.

In some embodiments, the fully-connected non-blocking interconnect includes a full crossbar. The crossbar may connect the N inputs to the P outputs in a fully matix manner. Crossbars are sometimes also referred to in the arts as crosspoint interconnects, crosspoint networks, matrix interconnects, matrix networks, full meshes, etc. In some embodiments, the crossbar is the only crossbar of the vector execution unit and/or the vector execution unit has only one interconnect in which N inputs are fully connected to P outputs where N and P are each at least four.

Referring again to the illustration, the execution unit includes the vector conflict instruction execution logic 1058 and the permute instruction execution logic 1056. Each of the vector conflict instruction execution logic and the permute instruction execution logic is coupled with the fully-connected interconnect. In particular, inputs of the vector conflict instruction execution logic are coupled with each of the P interconnect outputs of the fully-connected interconnect. Likewise, inputs of the permute instruction execution logic are coupled with each of the P interconnect outputs of the fully-connected interconnect. In the illustration, each of the P interconnect outputs has a corresponding branch 1074 where each line of the output is divided into two or more lines. One fork of each of these branches is provided to the vector conflict instruction execution logic, and another fork of each of these branches is provided to the permute instruction execution logic. Each of the outputs of the interconnect branches to both the permute instruction execution logic and the vector conflict instruction execution logic. Alternatively, rather than such branches, separate duplicated lines may optionally be used.

The vector conflict instruction execution logic and the permute instruction execution logic both share and use the fully-connected interconnect. During use, data elements from source operands (e.g., the source vector 1064), are routed, connected, conducted, coupled, or conveyed through the fully-connected interconnect to each of the vector conflict instruction execution logic and the permute instruction execution logic. In the illustration, for simplicity a single source vector is shown, although the source vector used by the permute and vector conflict instructions may either be the same or more often may be different. That is, each of the vector conflict instruction execution logic and the permute instruction execution logic is coupled to receive data elements from source operands through/from the fully-connected interconnect.

The vector conflict instruction execution logic utilizing the fully-connected interconnect is operable to implement the operation of the vector conflict instruction. In some embodiments, the operation of the vector conflict instruction is to detect duplicate data elements within a source vector. In some embodiments, the operation of the vector conflict instruction is to test or compare each data element of the source vector for equality with all other data elements of the source vector. In some embodiments, each data elements comparison results may form a bit vector within a data element of a first result vector 1067. A particular example of the first result vector is the indices_having_dependency_relationship data structure 301 of FIG. 3. The vector conflict instruction execution logic may be operable to store the first result vector in a destination storage location (e.g., a vector register or location in memory) in response to the vector conflict instruction.

The permute instruction execution logic utilizing the fully-connected interconnect is operable to implement the operation of the permute instruction. In some embodiments, the permute instruction may copy or store any data elements from one or more source vectors (e.g., source vector 1064) to any data elements in a second result vector 1066. In some embodiments, the permute operation may be similar to any of those discussed for FIG. 9. The permute instruction execution logic is operable to store the second result vector in a destination storage location (e.g., a vector register or location in memory) in response to the permute instruction.

Sharing the fully-connected interconnect between the vector conflict instruction execution logic and the permute instruction execution logic may offer certain advantages. For one thing, it may allow both the vector conflict instruction and the permute instruction to be implemented quickly and efficiently, while avoiding a cost, area, and power increase that would tend to occur if each of the vector conflict instruction execution logic and the permute instruction execution logic were deployed in different execution units and/or otherwise used a separate dedicated fully-connected interconnect. Generally, the area and power consumption of the network is dominated by the wiring/interconnections. The wiring/interconnections tend to be long, tend to take up a significant amount of space, and the circuitry to drive signals on the wires/interconnections tends to consume a significant amount of power. The logic gates used to implement the selections and comparisons (e.g., the comparators and MUXs) for the conflict/permute operations tend to be smaller and to consume less power. An advantage of sharing the wiring/interconnections among both the permute and conflict detection instructions/operations is that a majority of the area and power costs are apportioned or divided the two operations.

Figure 11:
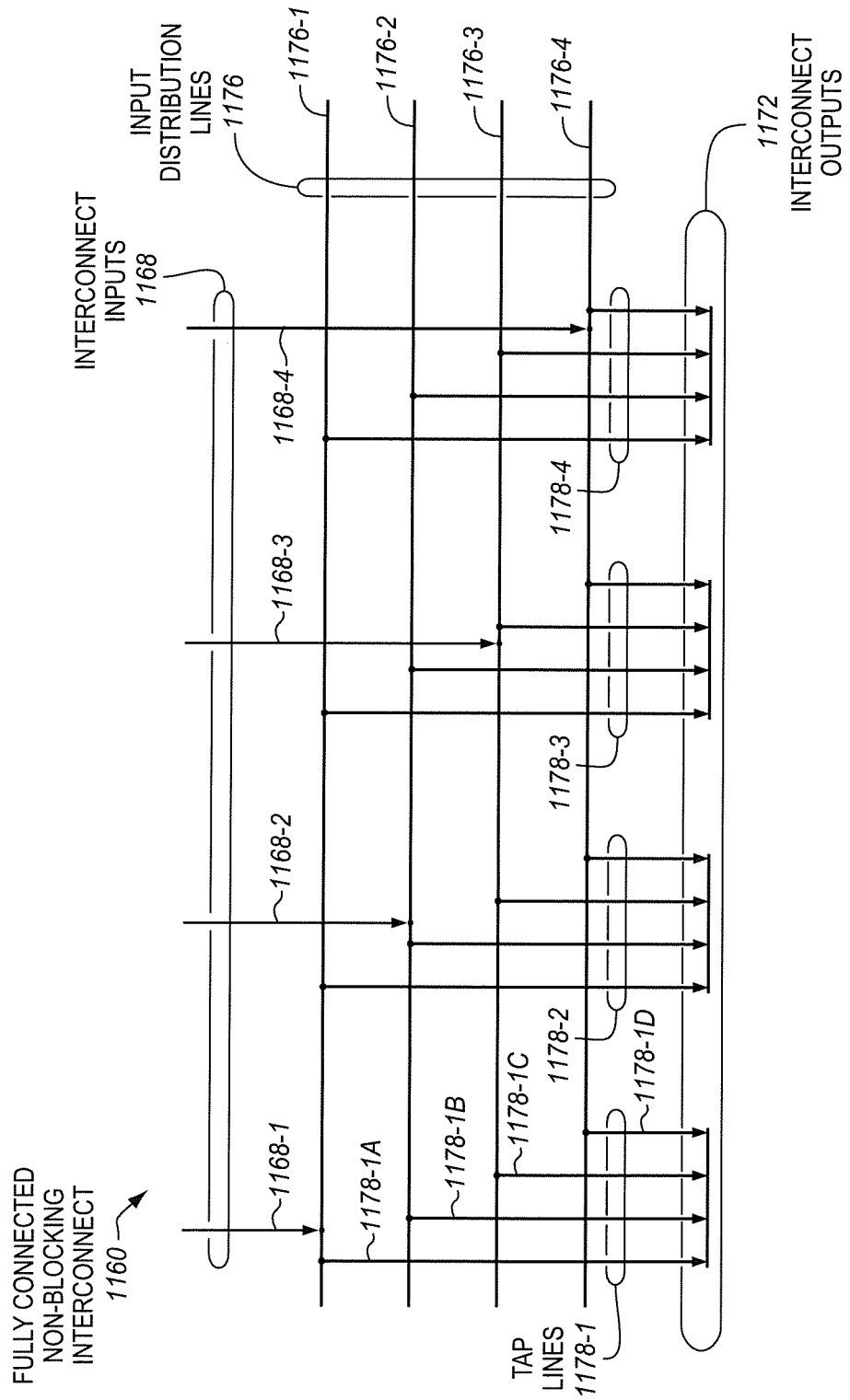
FIG. 11 is a circuit block diagram of an example embodiment of a fully-connected non-blocking interconnect.

FIG. 11 is a circuit block diagram of an example embodiment of a fully-connected non-blocking interconnect 1160. The illustrated fully-connected non-blocking interconnect has four interconnect inputs 1168 and four interconnect outputs 1172. It is to be appreciated that alternate embodiments may include more inputs and more outputs and that the numbers of inputs and outputs may be either the same or different.

The fully-connected interconnect has four input distribution lines 1176. In the illustration, they are shown as horizontal lines. The input distribution lines may represent metal wires, traces, interconnects, or other conductive paths. There may be one input distribution line for each of the inputs. A first input 1168-1 is coupled to a first input distribution line 1176-1, a second input 1168-2 is coupled to a second input distribution line 1176-2, a third input 1168-3 is coupled to a third input distribution line 1176-3, and a fourth input 1168-4 is coupled to a fourth input distribution line 1176-4. Data provided at each of the inputs is broadcast across the corresponding input distribution lines.

Each of the interconnect outputs 1172 has a corresponding set of tap lines 1178-1, 1178-2, 1178-3, 1178-4 coupled thereto. In the illustration, the sets of tap lines are shown as sets of vertical lines. The tap lines may represent metal wires, traces, interconnects, or other conductive paths. In the illustrated example, there are four outputs and four corresponding sets of tap lines. Each of the tap lines within a set is coupled to a different corresponding one of the input distribution lines. In the illustration, each tap line is only coupled to one of the input distribution lines (e.g., in the illustration each tap line is coupled to the input distribution line closest to its upper termination). For example, in a first set 1178-1 of tap lines, a first tap line 1178-1A is coupled to the first input distribution line 1176-1, a second tap line 1178-1B is coupled to the second input distribution line 1176-2, a third tap line 1178-1C is coupled to the third input distribution line 1176-3, and a fourth tap line 1178-1D is coupled to the fourth input distribution line 1176-4. A tap line within each of the sets of tap lines and/or for each output is coupled to each of the input distribution lines to convey the broadcast input data to the output.

Figure 12:
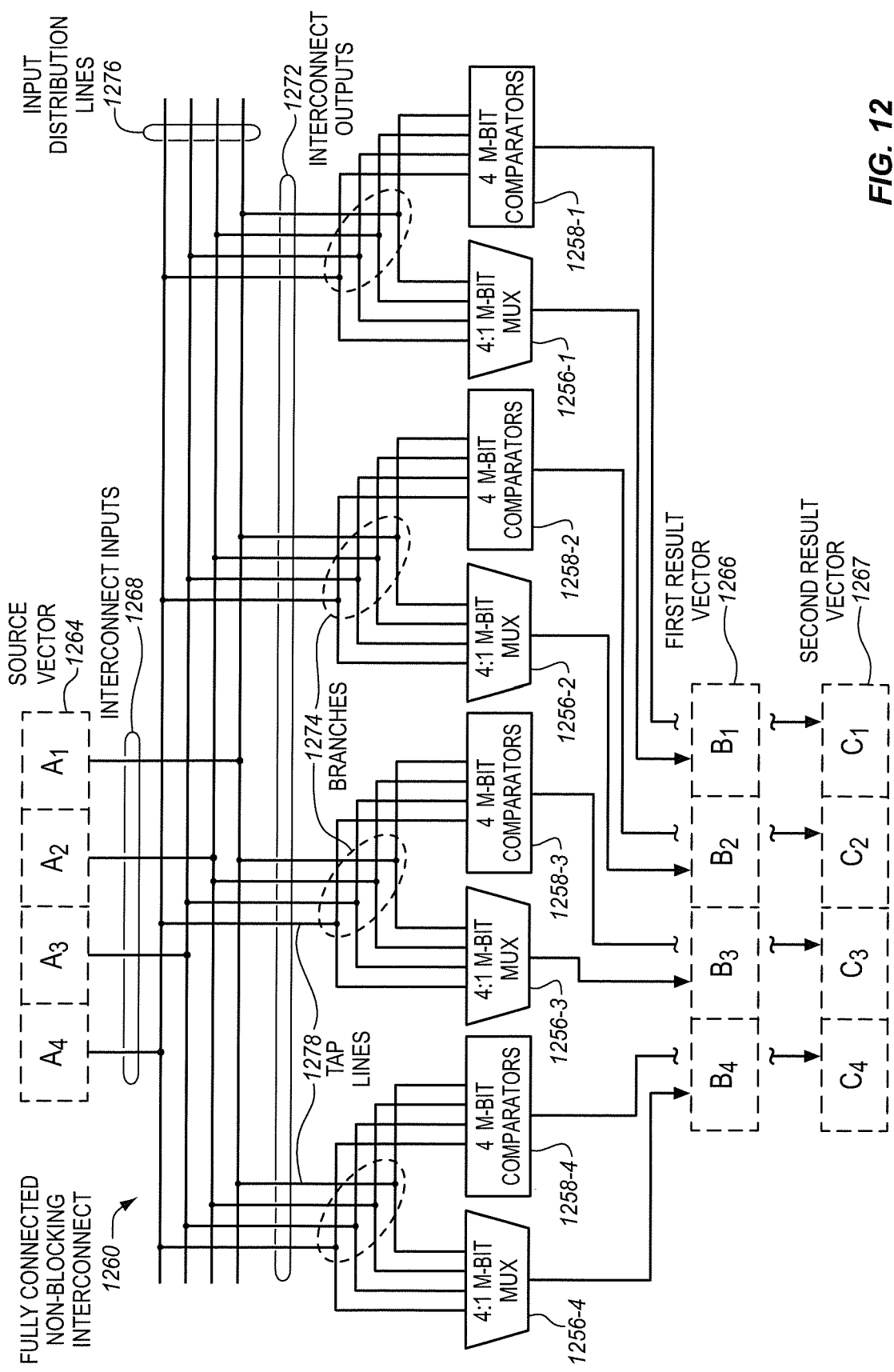
FIG. 12 is a circuit block diagram of a detailed example embodiment of four data element permute instruction execution logic, and four element vector conflict instruction execution logic that share a fully-connected interconnect.

FIG. 12 is a circuit block diagram of a detailed example embodiment of four data element permute instruction execution logic 1256, and four element vector conflict instruction execution logic 1258 that share a fully-connected interconnect 1260. The four data element permute and vector conflict instruction execution logics are each capable of operating on one or more source vectors 1264 each having four data elements to produce result vectors 1266, 1267 each having four data elements.

A source vector 1264 has four source data elements, which are labeled $A_1$-$A_4$. The fully-connected interconnect is coupled to receive the source vector. The fully-connected interconnect has four interconnect inputs 1268. Each of the interconnect inputs is coupled to receive a corresponding one of the data elements $A_1$-$A_4$. Each of the four inputs is coupled with a corresponding one of four input distribution lines 1276. The fully-connected interconnect also has four interconnect outputs 1272. One set of tap lines 1278 is provided per interconnect output. One tap line is provided per input distribution line within each set. Each of the tap lines within a set is coupled with a corresponding one of the input distribution lines.

The permute instruction execution logic 1256 is coupled with the fully-connected interconnect. The permute instruction execution logic includes four selectors 1256-1, 1256-2, 1256-3, 1256-4. Each of the selectors has an input that is coupled with a different one of the interconnect outputs 1272. During use, data elements from the source vector may be routed, connected, coupled, or otherwise conveyed through the fully-connected interconnect to the selectors. Each of the selectors 1256 is operable to select any of the four input data elements to be stored in a corresponding result data element in a first result vector 1266. By way of example, a first selector 1256-1 may select any one of the four input source data elements to be stored in a result data element $B_1$ of the first result vector, a second selector 1256-2 may select any one of the four input source data elements to be stored in a result data element $B_2$, a third selector 1256-3 may select any one of the four input source data elements to be stored in a third data element B3, and a fourth selector 1256-4 may select any one of the four input source data elements to be stored in a result data element B4. The selectors may include hardware, firmware, software, or a combination (e.g., hardware with potentially some firmware and/or software). As shown, in some embodiments, each of the selectors may include a 4:1 (4-input-to-1-output) multiplexer (MUX). Each of the 4:1 MUX may be controlled by an input control or select signal (not shown), which may be derived from an index provided by the permute instruction. Alternatively, other selector circuits may be utilized.

The vector conflict instruction execution logic 1258 is also coupled with the fully-connected interconnect. The vector conflict instruction execution logic includes four sets of four comparators 1258-1, 1258-2, 1258-3, 1258-4. The four sets of four comparators may represent an N×N comparator stem where N is four. Each of the four sets of comparators has four comparators (e.g., four physical or four logical comparators). Each of the sets of comparators has an input that is coupled with a different one of the interconnect outputs 1272. During use, data elements from the source vector may be routed, connected, coupled, or otherwise conveyed through the fully-connected interconnect to the selectors. Each of the sets of comparators 1258 is operable to perform an inter-element comparison and store a result of the comparison in a corresponding result data element of a second result vector 1267. The comparisons may be performed in parallel, rather than serially, which may help to provide for a fast and efficient implementation of the vector conflict instruction. In some embodiments, each of the sets of comparators may be operable to compare a different corresponding one of the input data elements with all of the other input data elements. For example, the first set of comparators 1258-1 may be operable to compare $A_1$ with $A_1$, $A_1$ with $A_2$, $A_1$ with $A_3$, and $A_1$ with $A_4$. As shown, in one aspect, this may include a trivial comparison of a data element with itself (e.g., comparing $A_1$ with $A_1$), or in another aspect such a trivial comparison may optionally be omitted. In embodiments where such a trivial comparison is omitted, each of the sets of comparators may omit one comparator. In some embodiments, the comparators may be implemented as exclusive OR (XOR) trees.

In some embodiments, the comparators may be logically but not physically separated (e.g., a single wide physical comparator may represent four logical narrower comparators). In some embodiments, each of the data elements may be M-bits wide (e.g., where M is 8-bits, 16-bits, 32-bits, or 64-bits), and each of the comparators may be M-bits wide in order to be operable to compare a pair of M-bit wide data elements. Alternatively, the comparators may be narrower than the data elements (e.g., less than M-bits wide), for example, to reduce the size/area of the comparators and/or the amount of power consumed by the comparators. For example, lowest order 8-bit or 16-bit subsets of 32-bit data elements may be compared. In some cases, this may lead to a false conflict (e.g., erroneously determine that data elements are equal when subsets of bits of the data elements are equal, but the full data elements are not equal), which may tend to increase the amount of serialization and reduce performance, but is functionally benign. The sets of comparators may include hardware, firmware, software, or a combination (e.g., hardware with potentially some firmware and/or software).

In the illustration, each of the outputs 1272 of the fully-connected interconnect has a number of branches 1274 that are used to provide the output to both the vector conflict instruction execution logic and the permute instruction execution logic. One fork of each of these branches is provided to the vector conflict instruction execution logic, and another fork of each of these branches is provided to the permute instruction execution logic. Alternatively, rather than branches, separate duplicated lines may optionally be used.

The fully-connected interconnect is shared by both the permute instruction execution logic and the vector conflict instruction execution logic. Advantageously, this tends to reduce the overall size and power consumption of the logic used to implement these instructions. Moreover, crossbars and other fully-connected interconnects tend to be line-limited as opposed to device-limited meaning that the area around the fully-connected interconnect tends to be dominated by the routing of the lines as opposed to transistors and other active and passive semiconductor devices/circuits. As such there tends to be an ample amount of semiconductor area to accommodate both the permute instruction execution logic and the vector conflict instruction execution logic on the same crossbar or other fully-connected interconnect.

Figure 13:
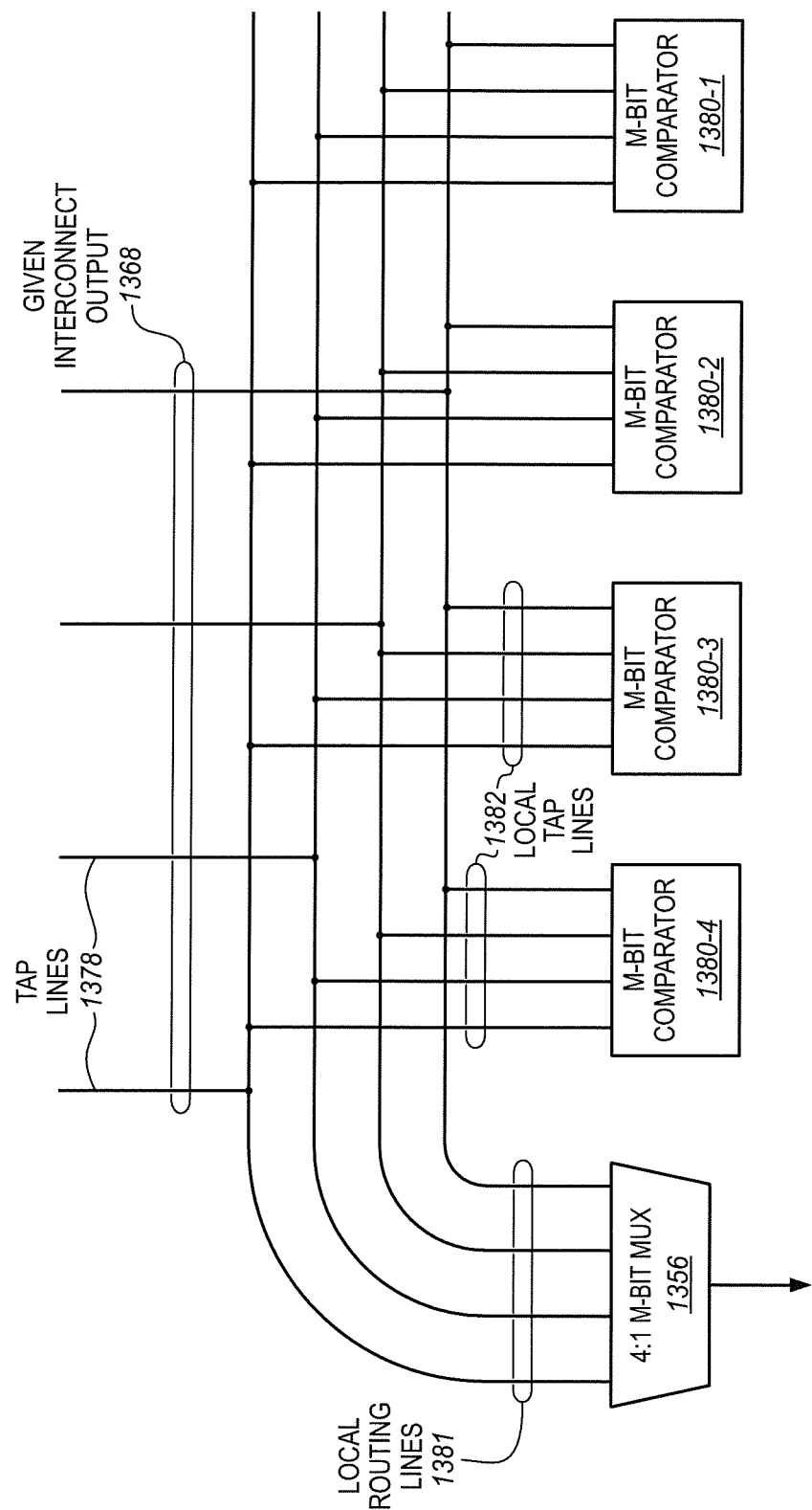
FIG. 13 is a circuit block diagram showing further details of an example embodiment of coupling a set of four M-bit comparators with a given interconnect output.

FIG. 13 is a circuit block diagram showing further details of an example embodiment of coupling a set of four M-bit comparators 1380-1, 1380-2, 1380-3, 1380-4 with a given interconnect output 1368 of a fully-connected interconnect. Four tap lines 1378 representing the given interconnect output 1368 are provided to four respective local routing lines 1381. Rather than the four tap lines being provided to only one of a 4:1 M-bit MUX 1356 or a set of four M-bit comparators 1380, the tap lines 1378 branch into the local routing lines and from there are provided to both the 4:1 M-bit MUX and the set of four M-bit comparators. In the particular illustration, the local routing lines terminate at the 4:1 M-bit MUX and a different set of four local tap lines 1382 is provided one for each of the four M-bit comparators, although this particular configuration is not required. Other ways of connecting a 4:1 M-bit MUX or other selector and a set of comparators to a given interconnect output are also contemplated.

Figure 14:
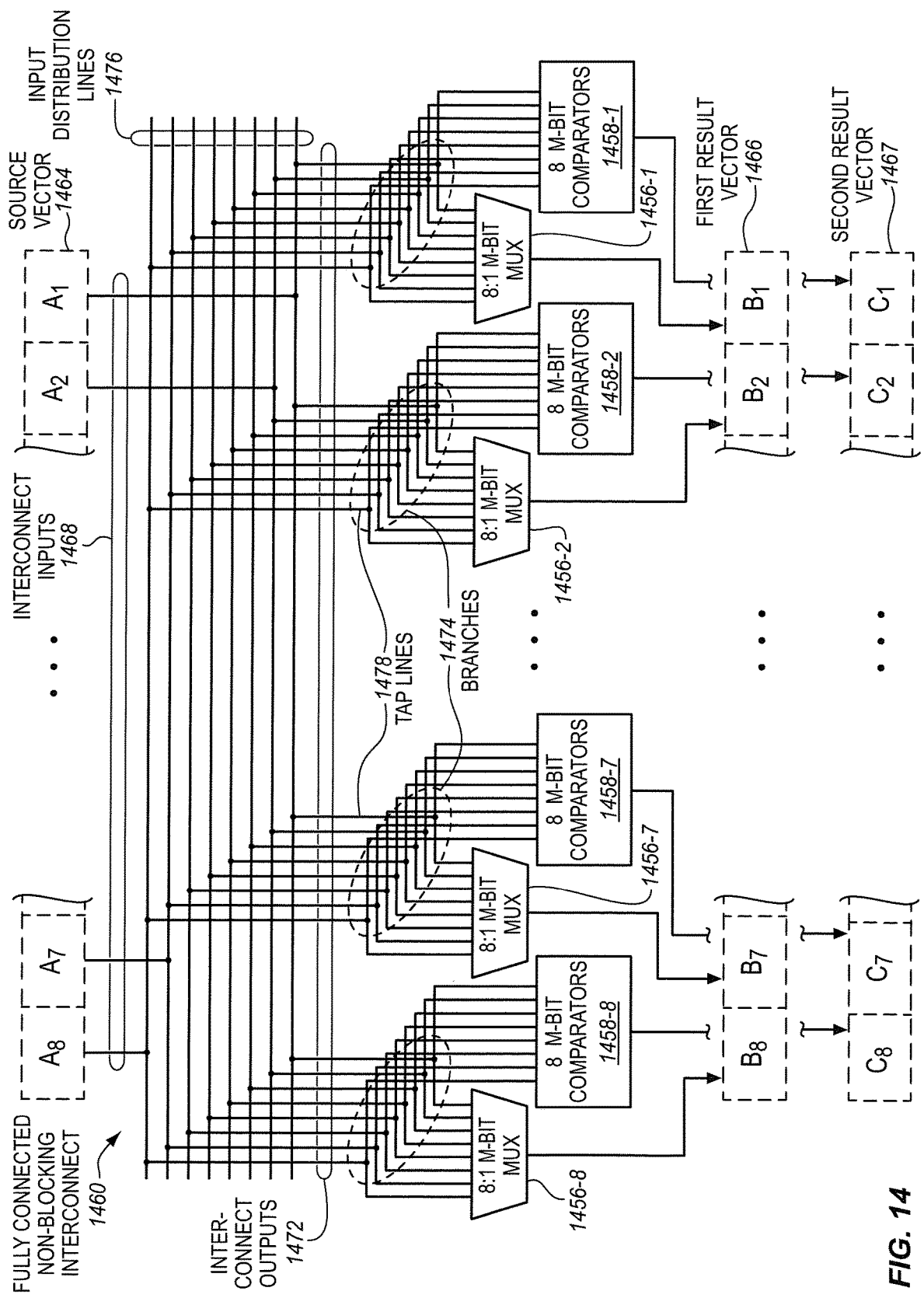
FIG. 14 is a block diagram of a detailed example embodiment of eight data element permute instruction execution logic, and eight data element vector conflict instruction execution logic that share a fully-connected interconnect.

FIG. 14 is a block diagram of a detailed example embodiment of eight data element permute instruction execution logic 1456, and eight data element vector conflict instruction execution logic 1458 that share a fully-connected interconnect 1460. The eight data element permute and vector conflict instruction execution logics are each capable of operating on one or more source vectors 1464 each having eight data elements to produce result vectors 1466, 1467 each having eight data elements. FIG. 14 has certain similarities to FIG. 12. To avoid obscuring the description, the discussion below will emphasize the different or additional features of the embodiment of FIG. 14 without repeating all of the similarities. It is to be understood that except where expressed otherwise, or otherwise readily apparent, that attributes and variations described for FIG. 12 may also apply to FIG. 14.

A source vector 1464 has eight source data elements labeled $A_1$-$A_8$. The fully-connected interconnect has eight interconnect inputs 1468 each coupled to receive a different corresponding one of the eight data elements $A_1$-$A_8$. Each of the eight inputs is coupled with a different corresponding one of eight input distribution lines 1476. The fully-connected interconnect also has eight interconnect outputs 1472. One set of tap lines 1478 and branches 1474 is provided per interconnect output. One tap line is provided per input distribution line within each set. Each of the tap lines within a set is coupled with a corresponding one of the input distribution lines.

The permute instruction execution logic 1456 is coupled with the fully-connected interconnect 1460. The permute instruction execution logic includes eight selectors 1456-1 through 1456-8. Each of the selectors has an input that is coupled with a different one of the interconnect outputs 1472. Each of the selectors is operable to select any of the eight input data elements to be stored in a corresponding result data element in a first result vector 1466. As shown, in some embodiments, each of the selectors may include a 8:1 MUX. Alternatively, other selector circuits may be utilized.

The vector conflict instruction execution logic 1458 is also coupled with the fully-connected interconnect. The vector conflict instruction execution logic includes eight sets of eight comparators 1458-1 through 1458-8. Each of the sets of comparators has an input that is coupled with a different one of the interconnect outputs 1472. Each of the sets of comparators is operable to perform an inter-element comparison and store a result of the comparison in a corresponding result data element of a second result vector 1467. In some embodiments, each of the sets of comparators may be operable to compare a different corresponding one of the input data elements with all of the other input data elements. For example, the first set of comparators 1458-1 may be operable to compare $A_1$ with $A_1$, $A_1$ with $A_2$, $A_1$ with $A_3$, $A_1$ with $A_4$, $A_1$ with $A_5$, $A_1$ with $A_6$, $A_1$ with $A_7$, and $A_1$ with $A_8$. While M-bit comparators for M-bit data elements are shown, in alternate embodiments the comparators may compare only a subset of bits of M-bit data elements.

These are just a few illustrative examples. For simplicity in the drawings, only four and eight data elements and associated four or eight wide instruction execution logic have been shown. However, it is to be appreciated that other embodiments with more than eight data elements and more than eight wide instruction execution logic are also contemplated. For example, another embodiment utilizes sixteen data element source vectors and has sixteen wide instruction execution logic. As another example, a further embodiment utilizes thirty-two data element source vectors and has thirty-two wide instruction execution logic.

Figure 15:
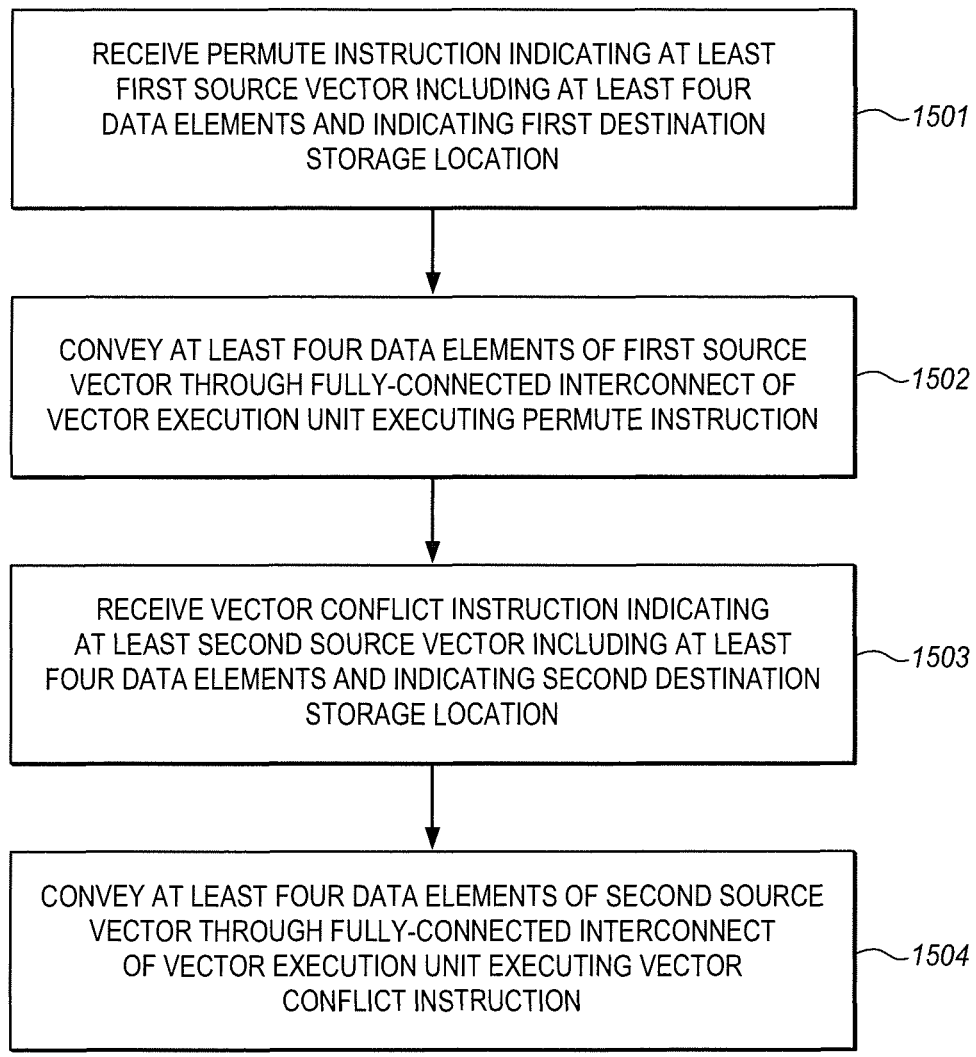
FIG. 15 is an example embodiment of a method of sharing a fully-connected interconnect for a permute instruction and a vector conflict instruction.

FIG. 15 is an example embodiment of a method 1500 of sharing a fully-connected interconnect for a permute instruction and a vector conflict instruction. The method may be performed by a processor.

The method includes receiving a permute instruction indicating at least a first source vector including at least four data elements and indicating a first destination storage location, at block 1501. The at least four data elements of the first source vector are conveyed through a fully-connected interconnect of a vector execution unit executing the permute instruction, at block 1502. In some embodiments, the fully-connected interconnect is a non-blocking fully-connected interconnect. In some embodiments, the fully-connected interconnect is a crossbar. A first result vector is stored in the first destination storage location in response to the permute instruction. In some embodiments, the first result vector may include a first plurality of data elements and each of the data elements of the first plurality may be capable of being any of the at least four data elements of the first source vector.

The method also includes receiving a vector conflict instruction indicating at least a second source vector including at least four data elements and indicating a second destination storage location, at block 1503. The at least four data elements of the second source vector are conveyed through the fully-connected interconnect of the vector execution unit executing the vector conflict instruction, at block 1504. A second result vector may be stored in the second destination storage location in response to the vector conflict instruction. In some embodiments, the second result vector includes a second plurality of data elements, and each of the data elements of the second plurality may include results of comparisons of a corresponding data element of the second source vector with other data elements of the second source vector.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-order and Out-of-order Core Block Diagram

Figures 16A, 16B:
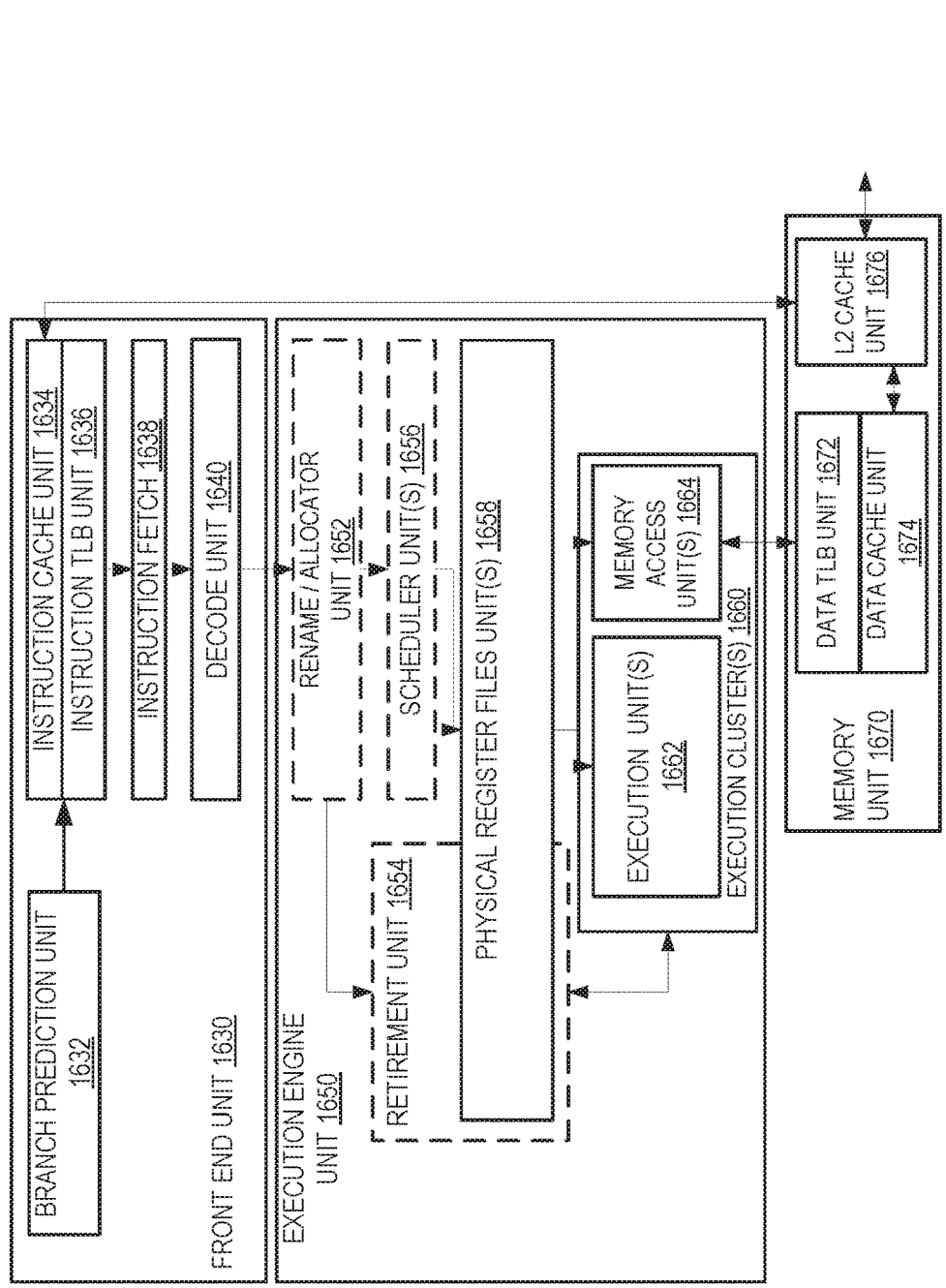
FIG. 16A is a block diagram illustrating both an exemplary in-order pipeline and an exemplary register renaming, out-of-order issue/execution pipeline according to embodiments of the invention.
FIG. 16B is a block diagram illustrating both an exemplary embodiment of an in-order architecture core and an exemplary register renaming, out-of-order issue/execution architecture core to be included in a processor according to embodiments of the invention.

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
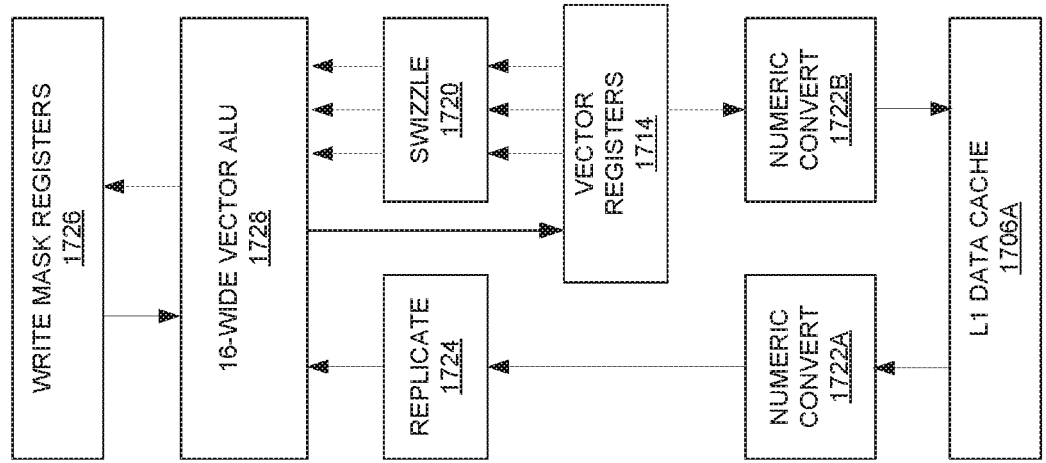
FIG. 17B is an expanded view of part of the processor core in FIG. 17A according to embodiments of the invention.
Figure 17A:
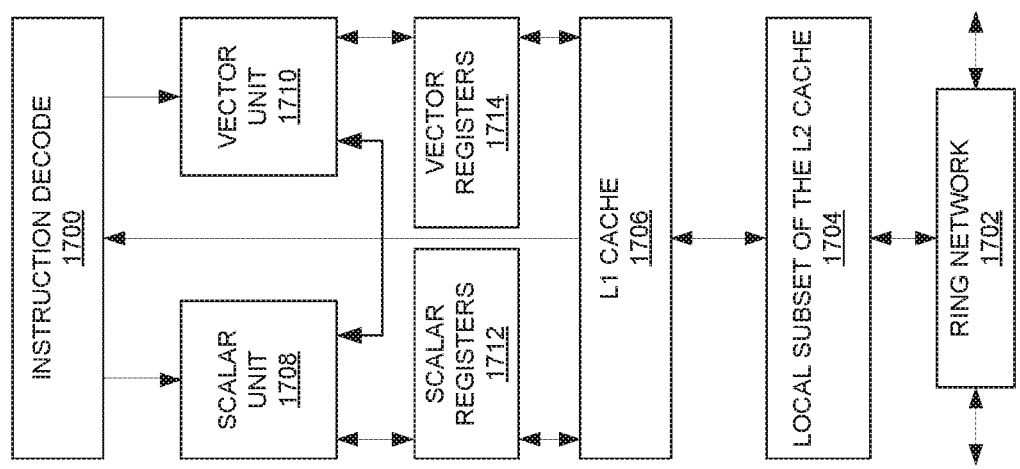
FIG. 17A is a block diagram of a single processor core, along with its connection to the on-die interconnect network and with its local subset of the Level 2 (L2) cache, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
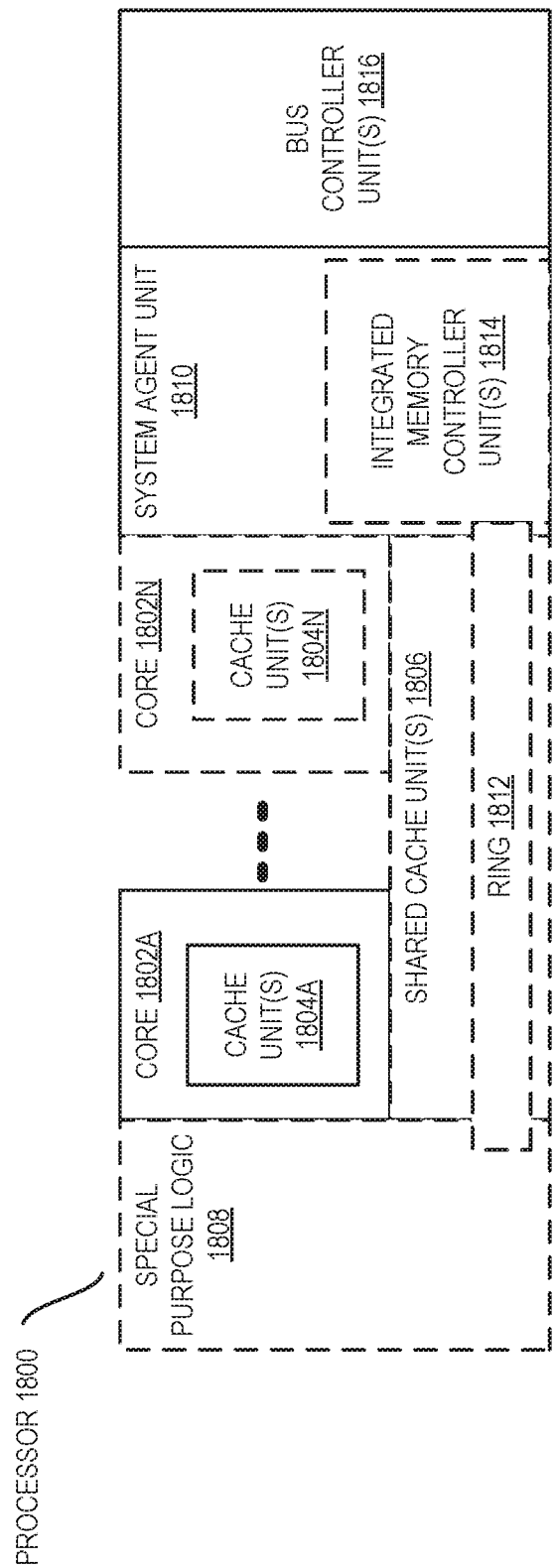
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes cache unit(s) 1804A-N providing one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
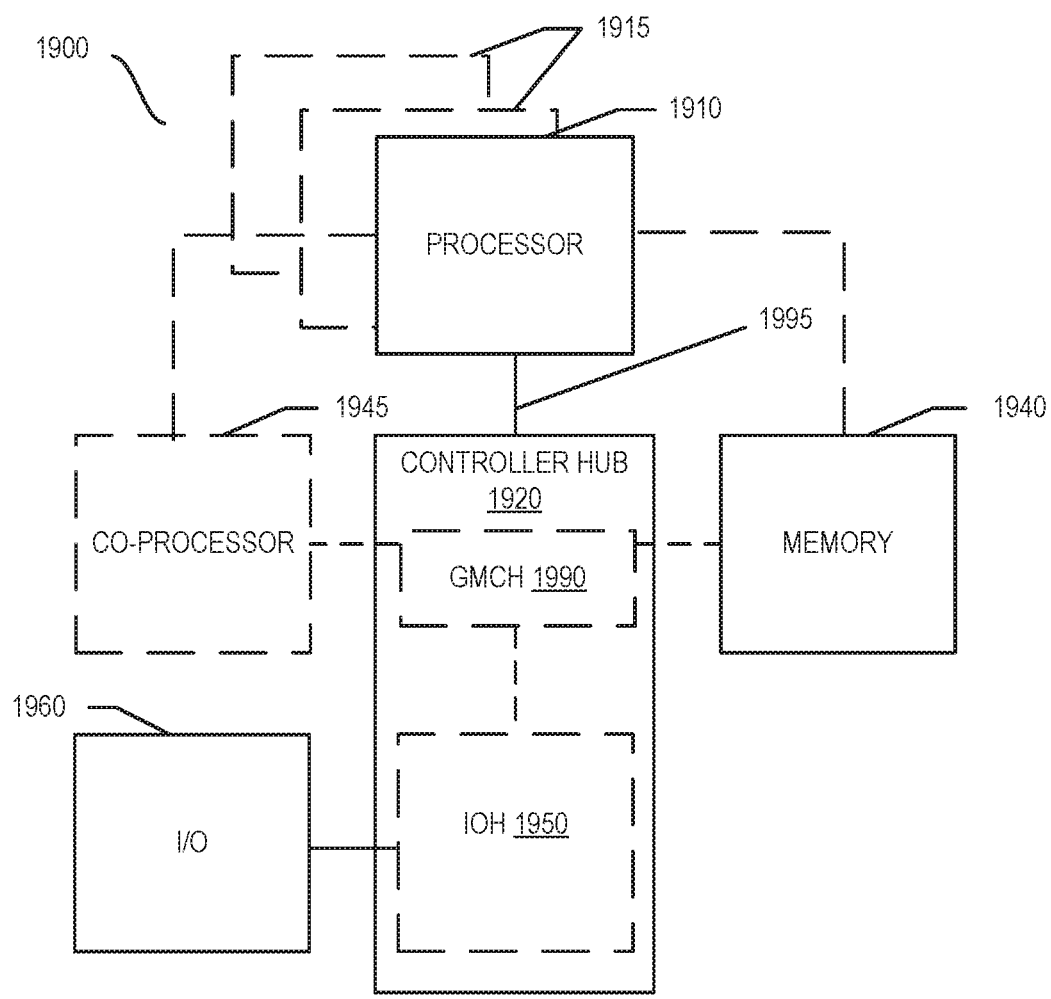
FIG. 19 shown is a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
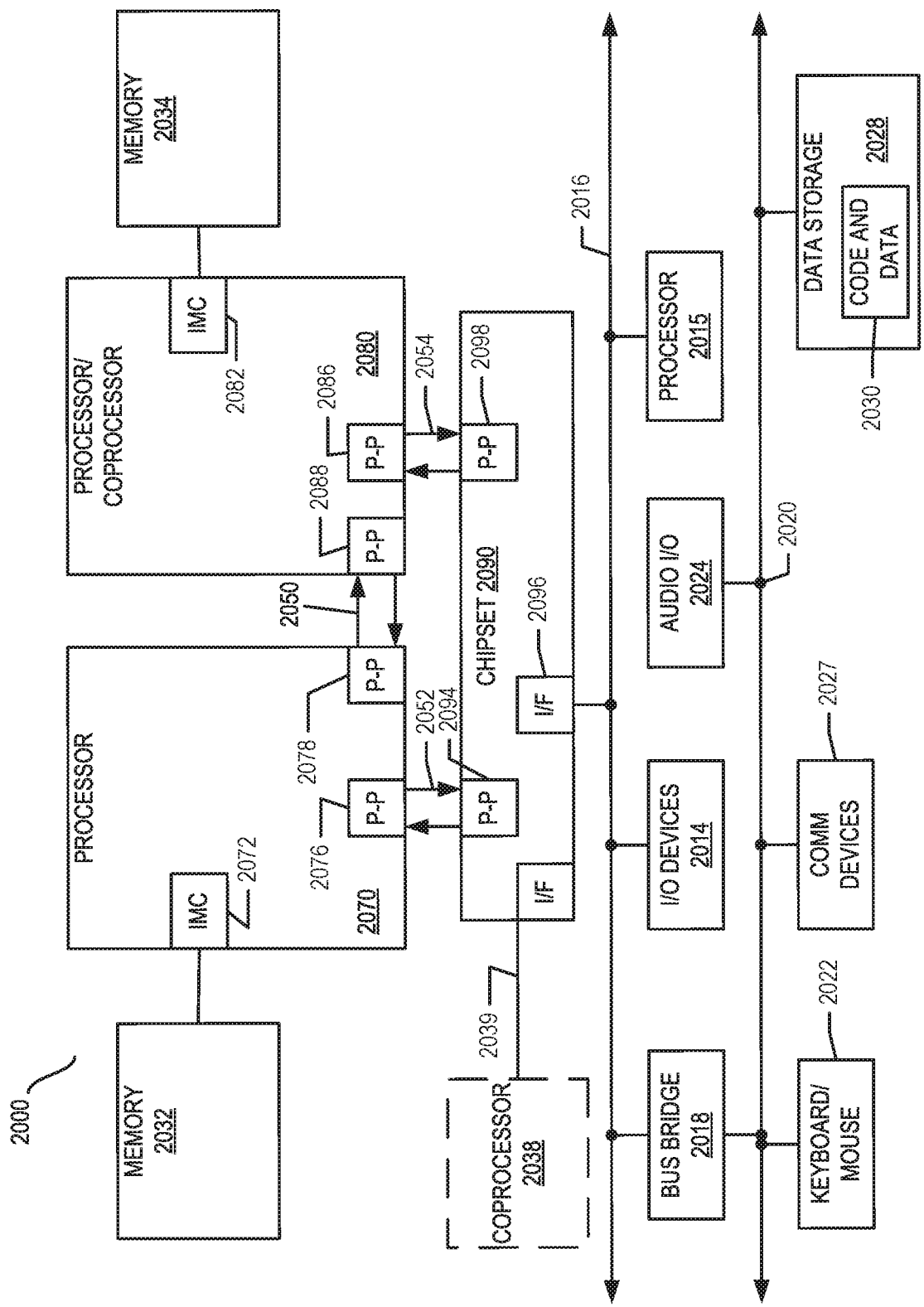
FIG. 20 shown is a block diagram of a first more specific exemplary system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors. Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
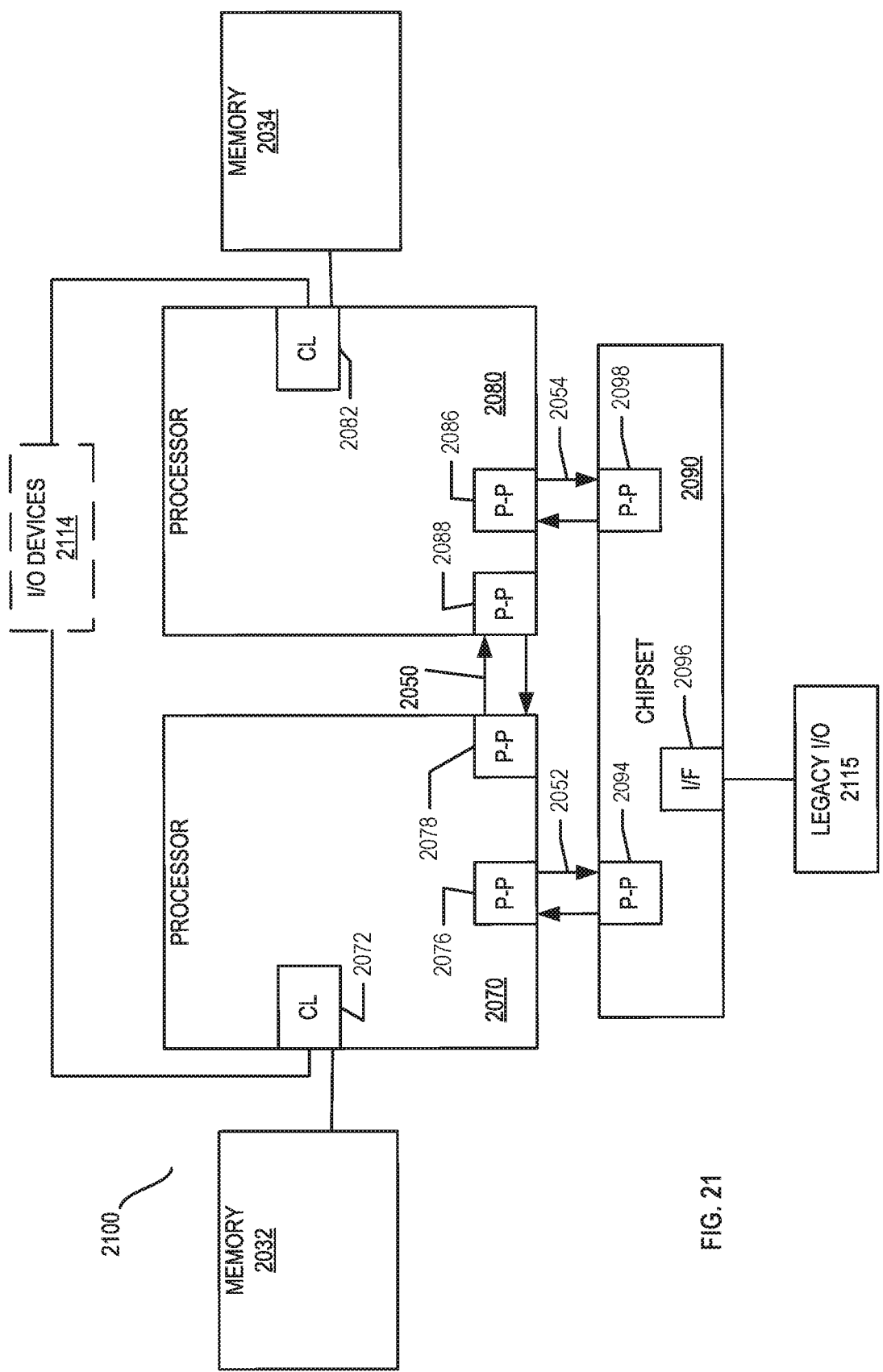
FIG. 21 shown is a block diagram of a second more specific exemplary system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
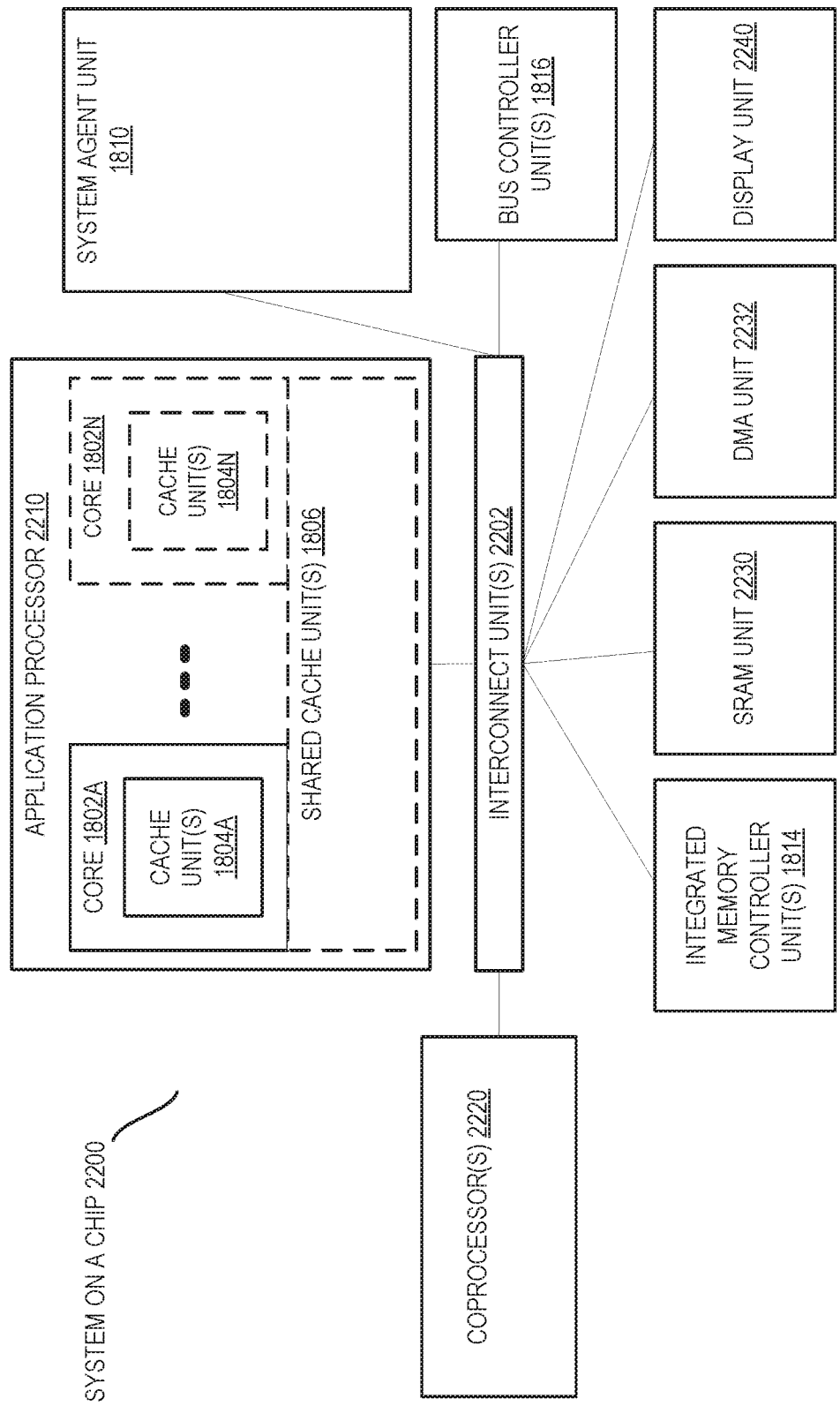
FIG. 22 shown is a block diagram of a SoC in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
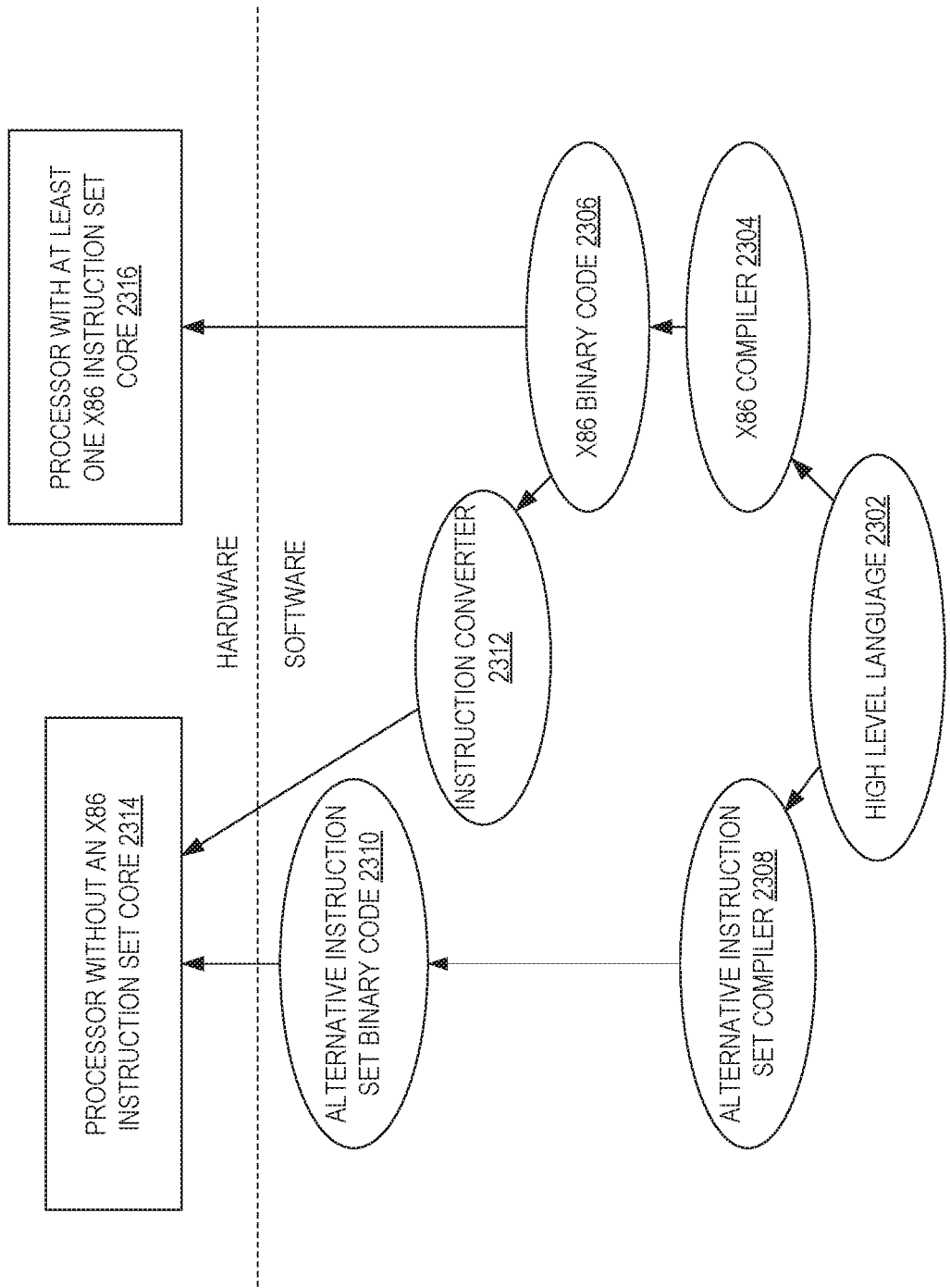
FIG. 23 is a block diagram contrasting the use of a software instruction converter to convert binary instructions in a source instruction set to binary instructions in a target instruction set according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the configurations, forms, functions, and manner of operation and use, of the components of the embodiments. All equivalent relationships to those illustrated in the drawings and described in the specification are encompassed within embodiments of the invention. For simplicity and clarity of illustration, elements illustrated in the figures have not necessarily been drawn to scale. For example, the dimensions of some of the elements may have been exaggerated relative to other elements for clarity. In the figures, arrows are used to show couplings and/or connections.

Various operations and methods have been described. Some of the methods have been described in a basic form in the flow diagrams, but operations may optionally be added to and/or removed from the methods. In addition, a particular order of the operations may have been described, according to example embodiments, it is to be understood that that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to instructions, microinstructions, or one or more control signals, derived from a machine instruction to perform certain operations.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus comprising:
a decode unit to decode a permute instruction and a vector conflict instruction; and
a vector execution unit coupled with the decode unit and including:
a fully-connected interconnect having at least four inputs to receive at least four corresponding data elements of at least one source vector, and at least four outputs, wherein each of the at least four inputs is coupled with each of the at least four outputs;
a first execution unit coupled with the at least four outputs, the first execution unit including selectors to select data elements, the first execution unit to store a first vector result in response to the permute instruction; and
a second execution unit coupled with the at least four outputs, the second execution unit including comparators to compare data elements, the second execution unit to store a second vector result in a destination storage location in response to the vector conflict instruction, the second vector result to include a plurality of bit vectors that each correspond to a different data element in a source vector of said at least one source vector, and each bit vector to include a plurality of bits that each represent a result of a different comparison,
wherein the fully-connected interconnect is to be shared by the first execution unit and the second execution unit, and wherein the shared fully-connected interconnect is to connect data elements to both the first execution unit and the second execution unit.

2. The apparatus of claim 1, wherein the fully-connected interconnect comprises a non-blocking interconnect.

3. The apparatus of claim 1, wherein the fully-connected interconnect comprises a crossbar.

4. The apparatus of claim 1, wherein the apparatus comprises a general-purpose microprocessor, and wherein the destination storage location comprises an architecturally-visible vector register.

5. The apparatus of claim 1, wherein the fully-connected interconnect comprises a crossbar, wherein the apparatus comprises a general-purpose microprocessor, and further comprising an architecturally-visible vector register to store the first vector result.

6. An apparatus comprising:
a decode unit to decode a permute instruction and a vector conflict instruction; and
a vector execution unit coupled with the decode unit and including:
a fully-connected interconnect having at least four inputs to receive at least four corresponding data elements of at least one source vector, and at least four outputs, wherein each of the at least four inputs is coupled with each of the at least four outputs;
a first execution unit coupled with the at least four outputs and to store a first vector result in response to the permute instruction, wherein the first execution unit comprises a selector at each of the at least four outputs to select any of the at least four corresponding data elements of the at least one source vector; and
a second execution unit coupled with the at least four outputs and to store a second vector result in a destination storage location in response to the vector conflict instruction, wherein the second execution unit comprises a comparator at each of the at least four outputs to compare a different corresponding one of the at least four corresponding data elements of the at least one source vector with all of the at least four corresponding data elements of the at least one source vector, the second vector result to include a plurality of bit vectors, including a given bit vector that is to include a plurality of bits, the bits to represent results of comparisons of a given one of the at least four data elements with said all of the at least four data elements.

7. The apparatus of claim 6, wherein the at least four corresponding data elements of the at least one source vector comprises N data elements, wherein the at least four outputs comprises N outputs, wherein each of the N data elements comprises M bits, wherein the first execution unit comprises an N:1 selector at each of the N outputs to select any one of the N data elements, and wherein the second execution unit comprises N, M-bit comparators at each of the N outputs to compare a different corresponding M-bit one of the N data elements with all of the N data elements.

8. The apparatus of claim 7, wherein N is at least 8.

9. The apparatus of claim 7, wherein N is at least 16 and M is one of 32 and 64.

10. The apparatus of claim 6, wherein the fully-connected interconnect comprises a crossbar.

11. The apparatus of claim 10, wherein the fully-connected interconnect comprises a crossbar, wherein the apparatus comprises a general-purpose microprocessor, and wherein the destination storage location comprises an architecturally-visible vector register.

12. An apparatus comprising:
a decode unit to decode a permute instruction and a vector conflict instruction; and
a vector execution unit coupled with the decode unit and including:
a fully-connected interconnect having at least four inputs to receive at least four corresponding data elements of at least one source vector, and at least four outputs, wherein each of the at least four inputs is coupled with each of the at least four outputs;
a first execution unit coupled with the at least four outputs, the first execution unit including selectors to select data elements, the first execution unit to store a first vector result in response to the permute instruction; and
a second execution unit coupled with the at least four outputs, the second execution unit including comparators to compare data elements, the second execution unit to store a second vector result in a destination storage location in response to the vector conflict instruction, the second vector result to include a plurality of bit vectors, including a given bit vector that is to include a plurality of bits, each bit to represent a result of a comparison of a given data element in a given source vector with a different corresponding one of all data elements in either the given source vector or another source vector, wherein the fully-connected interconnect is the only fully-connected interconnect of the vector execution unit that has at least four inputs fully connected to at least four outputs.

13. The apparatus of claim 12, wherein the apparatus comprises a general-purpose microprocessor, and further comprising an architecturally-visible vector register to store the first vector result.

14. The apparatus of claim 13, wherein the fully-connected interconnect comprises a crossbar.

15. An apparatus comprising:
a decode unit to decode a permute instruction and a vector conflict instruction; and
a vector execution unit coupled with the decode unit and including:
a fully-connected interconnect having at least four inputs to receive at least four corresponding data elements of at least one source vector, and at least four outputs, wherein each of the at least four inputs is coupled with each of the at least four outputs;
a first execution unit coupled with the at least four outputs, the first execution unit including selectors to select data elements, the first execution unit to store a first vector result in response to the permute instruction; and
a second execution unit coupled with the at least four outputs, the second execution unit including comparators to compare data elements, the second execution unit to store a second vector result in a destination storage location in response to the vector conflict instruction, the second vector result to include a plurality of bit vectors that each correspond to a different data element in a source vector of said at least one source vector, each bit vector to include a plurality of bits that each represent a result of a different comparison,
wherein each of the at least four outputs of the fully-connected interconnect branches to both the first execution unit and the second execution unit.

16. A processor comprising:
a decode unit; and
an execution unit, the execution unit including:
a fully-connected interconnect having at least four inputs to receive at least four corresponding data elements of at least one source vector, and at least four outputs, wherein each of the at least four inputs is coupled with each of the at least four outputs;
a permute instruction execution circuit coupled with the at least four outputs and to store a first vector result in response to a permute instruction; and
a vector conflict instruction execution circuit coupled with the at least four outputs and to store a second vector result in a destination storage location in response to a vector conflict instruction, the second vector result to include a plurality of bit vectors that each correspond to a different data element in a source vector of said at least one source vector, each bit vector to include a plurality of bits that each represent a result of a different comparison,
wherein the fully-connected interconnect is to be shared by the permute instruction execution circuit and the vector conflict instruction execution circuit to receive data therefrom.

17. The processor of claim 16, wherein the fully-connected interconnect comprises a non-blocking interconnect.

18. An apparatus comprising:
a decode unit to decode a permute instruction and a vector conflict instruction; and
a vector execution unit coupled with the decode unit and including:
a fully-connected interconnect having at least four inputs to receive at least four corresponding data elements of at least one source vector, and at least four outputs, wherein each of the at least four inputs is coupled with each of the at least four outputs;
a plurality of selectors coupled with the at least four outputs, the plurality of selectors, to be controlled responsive to the permute instruction being decoded, to select data elements and to store a first vector result; and
a plurality of comparators coupled with the at least four outputs, the plurality of comparators, to be controlled responsive to the vector conflict instruction being decoded, to compare data elements and to store a second vector result in a destination storage location, the second vector result to include a plurality of bit vectors that each correspond to a different data element in a source vector of said at least one source vector, each bit vector to include a plurality of bits that are each to be a result of a different corresponding comparison,
wherein the fully-connected interconnect is to be shared by the plurality of selectors that are to be controlled responsive to the permute instruction being decoded, and by the plurality of comparators that are to be controlled responsive to the vector conflict instruction being decoded, and wherein the fully-connected interconnect is to connect data elements to both the plurality of selectors that are to be controlled responsive to the permute instruction being decoded and the plurality of comparators that are to be controlled responsive to the vector conflict instruction being decoded.

* * * * *